US010219165B2

(12) United States Patent
Futaki

(10) Patent No.: US 10,219,165 B2
(45) Date of Patent: Feb. 26, 2019

(54) RADIO COMMUNICATION SYSTEM, RADIO COMMUNICATION METHOD, RADIO BASE STATION AND CONTROL STATION

(71) Applicant: Hisashi Futaki, Tokyo (JP)

(72) Inventor: Hisashi Futaki, Tokyo (JP)

(73) Assignee: NEC CORPORATION, Minato-ku, Tokyo (JP)

( * ) Notice: Subject to any disclaimer, the term of this patent is extended or adjusted under 35 U.S.C. 154(b) by 0 days.

(21) Appl. No.: 15/245,701

(22) Filed: Aug. 24, 2016

(65) Prior Publication Data
US 2016/0366595 A1 Dec. 15, 2016

Related U.S. Application Data

(63) Continuation of application No. 13/256,123, filed as application No. PCT/JP2010/054099 on Mar. 11, 2010.

(30) Foreign Application Priority Data

Mar. 13, 2009 (JP) .................................. 2009-061470

(51) Int. Cl.
*H04W 16/18* (2009.01)
*H04W 24/02* (2009.01)
(Continued)

(52) U.S. Cl.
CPC .............. *H04W 16/18* (2013.01); *H04L 43/16* (2013.01); *H04W 24/02* (2013.01);
(Continued)

(58) Field of Classification Search
CPC . H04W 24/02; H04W 16/18; H04W 36/0061; H04W 36/18; H04W 60/00; H04L 63/101
See application file for complete search history.

(56) References Cited

U.S. PATENT DOCUMENTS 5,073,972 A * 12/1991 Tendler ................ H04B 1/3877
340/7.5
5,781,536 A * 7/1998 Ahmadi ................. H04B 1/713
370/252
(Continued)

FOREIGN PATENT DOCUMENTS

CN 1809199 A 7/2006
CN 1985532 A 6/2007
(Continued)

OTHER PUBLICATIONS

3GPP TS 36.300, V8.7.0, Technical Specification, 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8), Dec. 2008, pp. 1-144.
(Continued)

Primary Examiner — Matthew C Sams
(74) Attorney, Agent, or Firm — Sughrue Mion, PLLC

(57) ABSTRACT

A radio communication system includes a plurality of radio base stations and a control station connected to the radio base stations. One of the radio base stations notifies state control information including information regarding state control to the control station before or after execution of state control in the one radio base station. The control station notifies at least one of management information regarding the radio parameter updated in accordance with the state control and the state control information to the radio base stations connected to the control station, with the exclusion of the one radio base station that notified the state control information.

9 Claims, 30 Drawing Sheets

(51) Int. Cl.
*H04W 36/00* (2009.01)
*H04W 52/40* (2009.01)
*H04W 72/04* (2009.01)
*H04L 12/26* (2006.01)
*H04W 88/08* (2009.01)
*H04W 92/20* (2009.01)
*H04W 84/18* (2009.01)
*H04W 88/12* (2009.01)

(52) U.S. Cl.
CPC ....... *H04W 36/0061* (2013.01); *H04W 52/40* (2013.01); *H04W 72/0433* (2013.01); *H04W 84/18* (2013.01); *H04W 88/08* (2013.01); *H04W 88/12* (2013.01); *H04W 92/20* (2013.01)

(56) References Cited

U.S. PATENT DOCUMENTS

| | | | |
|---|---|---|---|
| 6,112,081 A * | 8/2000 | Namura | H04W 24/04 455/424 |
| 6,535,740 B1 | 3/2003 | Kosugi | |
| 6,584,330 B1 * | 6/2003 | Ruuska | H04W 52/0206 455/423 |
| 6,744,740 B2 | 6/2004 | Chen | |
| 7,088,959 B2 * | 8/2006 | Ho | H04W 16/06 455/412.2 |
| 7,130,627 B2 * | 10/2006 | Lundh | H04W 36/0083 455/434 |
| 7,420,925 B2 | 9/2008 | Hori et al. | |
| 7,813,329 B2 | 10/2010 | Mori et al. | |
| 8,107,964 B2 | 1/2012 | Nylander et al. | |
| 8,248,979 B2 * | 8/2012 | Kleindl | H04W 52/028 370/311 |
| 8,249,578 B2 | 8/2012 | Yagyu et al. | |
| 8,306,533 B2 * | 11/2012 | Fallon | H04W 92/045 370/331 |
| 8,428,638 B2 * | 4/2013 | Khan | H04W 52/287 455/453 |
| 8,447,368 B2 * | 5/2013 | Zettler | H04W 88/08 370/311 |
| 8,452,288 B2 | 5/2013 | Cho et al. | |
| 8,532,683 B2 * | 9/2013 | Koskinen | H04W 72/005 455/3.01 |
| 8,547,887 B2 * | 10/2013 | Olson | H04M 1/725 370/311 |
| 8,583,119 B2 | 11/2013 | Catovic et al. | |
| 8,687,597 B2 * | 4/2014 | Chen | H04W 24/02 370/310.2 |
| 8,885,500 B2 * | 11/2014 | Lindqvist | H04W 24/02 370/252 |
| 9,049,671 B2 * | 6/2015 | Yamazaki | H04W 52/0225 |
| 9,049,689 B2 * | 6/2015 | Osterling | H04W 74/006 |
| 2003/0171132 A1 * | 9/2003 | Ho | H04W 16/06 455/522 |
| 2003/0190930 A1 * | 10/2003 | Lim | H04W 24/00 455/560 |
| 2004/0092287 A1 | 5/2004 | Hori et al. | |
| 2004/0171346 A1 * | 9/2004 | Lin | G08C 17/02 455/3.05 |
| 2005/0250456 A1 * | 11/2005 | Motohashi | H04W 52/0235 455/92 |
| 2006/0121907 A1 | 6/2006 | Mori et al. | |
| 2006/0223538 A1 * | 10/2006 | Haseba | H04W 36/18 455/436 |
| 2007/0093268 A1 | 4/2007 | Hosono et al. | |
| 2008/0049702 A1 * | 2/2008 | Meylan | H04W 48/20 370/342 |
| 2008/0107082 A1 | 5/2008 | Igarashi et al. | |
| 2008/0198798 A1 * | 8/2008 | Wu | H04W 16/02 370/328 |
| 2008/0207207 A1 | 8/2008 | Moe et al. | |
| 2008/0298275 A1 | 12/2008 | De Sousa | |
| 2009/0047956 A1 | 2/2009 | Moe et al. | |
| 2009/0047968 A1 * | 2/2009 | Gunnarsson | H04W 48/12 455/446 |
| 2009/0052350 A1 * | 2/2009 | Chen | H04W 24/02 370/255 |
| 2009/0161628 A1 * | 6/2009 | Kubota | H04W 24/02 370/331 |
| 2009/0253461 A1 | 10/2009 | Kuwahara | |
| 2010/0015981 A1 | 1/2010 | Shimazaki et al. | |
| 2010/0130203 A1 * | 5/2010 | Fallon | H04W 92/045 455/435.1 |
| 2010/0173630 A1 * | 7/2010 | Han | H04W 36/0072 455/433 |
| 2010/0278038 A1 * | 11/2010 | Stahle | H04W 24/04 370/216 |
| 2011/0021224 A1 * | 1/2011 | Koskinen | H04W 72/005 455/507 |
| 2011/0026493 A1 * | 2/2011 | Gao | H04W 24/02 370/332 |
| 2011/0070883 A1 * | 3/2011 | Wang | H04W 16/10 455/424 |
| 2011/0076964 A1 * | 3/2011 | Dottling | H04W 52/0232 455/68 |
| 2011/0092220 A1 * | 4/2011 | Bernini | H04W 16/04 455/452.2 |
| 2011/0237258 A1 * | 9/2011 | Nylander | H04J 11/0093 455/437 |
| 2011/0256826 A1 | 10/2011 | Ode et al. | |
| 2011/0300887 A1 * | 12/2011 | Osterling | H04W 52/0206 455/507 |
| 2011/0319110 A1 * | 12/2011 | Futaki | H04W 24/02 455/507 |
| 2012/0009936 A1 | 1/2012 | Ishii et al. | |
| 2016/0337990 A1 | 11/2016 | Mitsui et al. | |

FOREIGN PATENT DOCUMENTS

| | | | |
|---|---|---|---|
| CN | 101370276 A | 2/2009 | |
| CN | 101370277 A | 2/2009 | |
| CN | 101541032 A | 9/2009 | |
| EP | 1 775 981 A1 | 4/2007 | |
| EP | 1983772 A1 * | 10/2008 | H04W 24/02 |
| EP | 2 257 085 A1 | 12/2010 | |
| EP | 2257085 A1 | 12/2010 | |
| JP | 11-215552 A | 8/1999 | |
| JP | 2000-151501 A | 5/2000 | |
| JP | 2003-037555 A | 2/2003 | |
| JP | 2004-92287 A | 3/2004 | |
| JP | 2004-165810 A | 6/2004 | |
| JP | 2004260445 A * | 9/2004 | |
| JP | 2005-354549 A | 12/2005 | |
| JP | 2008118551 A | 5/2006 | |
| JP | 2006-140829 A | 6/2006 | |
| JP | 2006-352477 A | 12/2006 | |
| JP | 2006332844 A | 12/2006 | |
| JP | 2007-87752 A | 4/2007 | |
| JP | 2007116392 A | 5/2007 | |
| JP | 2008-42557 A | 2/2008 | |
| JP | 2009-010701 A | 1/2009 | |
| JP | 2009-010799 A | 1/2009 | |
| KR | 10-2009-0008398 | 1/2009 | |
| WO | 98/57516 A2 | 12/1998 | |
| WO | 02/07464 A1 | 1/2002 | |
| WO | 2004-075583 A1 | 9/2004 | |
| WO | WO 2004075583 A1 * | 9/2004 | H04W 88/08 |
| WO | 2006082816 A1 | 8/2006 | |
| WO | 2007/083541 A1 | 7/2007 | |
| WO | WO 2008125147 A1 * | 10/2008 | H04W 92/045 |
| WO | 2009/022533 A1 | 2/2009 | |
| WO | 2009/022752 A1 | 2/2009 | |
| WO | 2009/140988 A1 | 11/2009 | |
| WO | WO 2009140988 A1 * | 11/2009 | H04W 52/0232 |
| WO | 2010/086979 A1 | 8/2010 | |

(56) References Cited

FOREIGN PATENT DOCUMENTS

WO 2010/093298 A1 8/2010
WO 2015/115356 A1 8/2015

OTHER PUBLICATIONS

3GPP TS 36.902, V1.0.1, Technical Specification, 3rd Generation Partnership Project; Technical Specification Group Radio Access Network; Evolved Universal Terrestrial Radio Access Network (E-UTRAN); Self-configuring and self-optimizing network use cases and solutions (Release 8), Sep. 2008, pp. 1-15.
3GPP TSG RAN Meeting #61, Mitsubishi Electric, "Dynamic Setup of HNBs for Energy Savings and Interference Reduction," Jeju Island, Korea, Aug. 18-22, 2008, pp. 1-7.
3GPP TSG-RAN WG3 #61bis, Orange, Alcatel-Lucent, "Solution for Interference Reduction SON Use Case," Kansas City, MO, USA, May 5-9, 2008, pp. 1-6.
3GPP TSG-RAN WG3 Meeting #60, Nokia Siemens Networks, Nokia, "Consideration on 36.902s Interference Reduction Use Case", Kansas City, MO, USA, May 5-9, 2008, pp. 1-5.
Communication dated Apr. 30, 2015, issued by the U.S. Patent and Trademark Office in corresponding U.S. Appl. No. 13/872,826.
Communication dated Feb. 9, 2016, from the Japanese Patent Office in counterpart application No. 2015-090438.
Communication dated Jul. 29, 2014, issued by the Japanese Patent Office in counterpart Japanese application No. 2013-084659.
Communication dated May 15, 2014 issued in the State Intellectual Property of the P.R. of China in counter part of the Chinese application No. 201080011848.4.
Communication dated Oct. 21, 2014, issued by the United States Patent and Trademark Office in counterpart U.S. Appl. No. 13/256,123.
EP Search Report dated Feb. 4, 2013 in corresponding EP Application No. 12189633.6.
European Search Report dated Feb. 4, 2013 issued by the European Patent Office in counterpart European Patent Application No. 12189633.6.
NGMN Allience, "Use Cases related to Self Organising Network. Overall Description.," Working Document, Apr. 16, 2007, pp. 1-14.
Nokia Siemens Networks et al, "Considerations on 36.902s Interference Reduction Use Case", 3GPP TSG-RAN WG3 Meeting #60, Apr. 30, 2008, 5 pages, Kansas City, MO.
Non-Final Office Action dated Sep. 19, 2014 from the U.S. Patent & Trademark Office in U.S. Appl. No. 13/774,403.
Notice of Grounds for Rejection, dated Jan. 7, 2014, issued by the Japanese Patent Office, in counterpart Application No. 2013-084659.
Office Action dated Aug. 28, 2013, issued by the Intellectual Property Office of the P.R.C. in corresponding application No. 201080011848.4.
Office Action dated May 27, 2014 issued by the State Intellectual Property of the People's Republic of China in counterpart Chinese Patent Application No. 201210240609.7.
Office Action dated May 7, 2013 issued by the Japanese Patent Office in counterpart Japanese Patent Application No. 2011-503856.
Office Action dated May 7, 2013 issued by the Japanese Patent Office in counterpart Japanese Patent Application No. 2013-057912.
Communication dated Feb. 7, 2017, from the Japanese Patent Office in counterpart Japanese application No. 2016-078948.
Communication dated Sep. 15, 2016, issued by the U.S. Patent and Trademark Office in related U.S. Appl. No. 13/872,826.
Communication dated Mar. 20, 2018, from Japanese Patent Office in counterpart application No. 2017-044740.
Japanese Decision to Grant dated Dec. 25, 2018 in Japanese Patent Application No. 2018-220278.
3GPP TSG RAN WG3 Meeting #57, R3-071414, "Self-Optimization for neighbor cell lists maintenance", ZTE 13.3.4b, 3 pages, Aug. 20, 2007.
Office Action dated Dec. 26, 2018 in Indian Patent Application No. 3385/CHENP/2013.

* cited by examiner

FIG. 3A Tx FOR A SPECIFIED FREQUENCY (CELL) IS SWITCHED OFF

FIG. 3B Tx FOR THE TOTAL OF FREQUENCIES (CELLS) IS SWITCHED OFF

FIG. 7A
Neighbour Cell List (NCL) at eNB1
| Index | 1 | 2 | 3 | ... |
|---|---|---|---|---|
| Target Cell ID | TCI#2 | TCI#3 | TCI#4 | ..... |
FIG. 7C
Neighbour Cell List (NCL) at eNB2
| Index | 1 | 2 | 3 | ... |
|---|---|---|---|---|
| Target Cell ID | TCI#1 | TCI#3 | TCI#8 | ..... |
FIG. 7B
updated NCL at eNB1
| Index | 1 | 2 | 3 | ... |
|---|---|---|---|---|
| Target Cell ID | TCI#2 | TCI#4 | TCI#8 | ..... |
FIG. 7D
updated NCL at eNB2
| Index | 1 | 2 | 3 | ... |
|---|---|---|---|---|
| Target Cell ID | TCI#1 | TCI#8 | TCI#9 | ..... |

FIG. 8A

White Neighbour Cell List (NCL) at eNB1

| Index | 1 | 2 | 3 | ... |
|---|---|---|---|---|
| Target Cell ID | TCI#2 | TCI#3 | TCI#4 | |

Black Neighbour Cell List (NCL) at eNB1

| Index | 1 | 2 | 3 | ... |
|---|---|---|---|---|
| Target Cell ID | TCI#5 | TCI#6 | | |

FIG. 8B updated White NCL at eNB1

| Index | 1 | 2 | 3 | ... |
|---|---|---|---|---|
| Target Cell ID | TCI#2 | TCI#4 | TCI#8 | | updated Black NCL at eNB1

| Index | 1 | 2 | 3 | ... |
|---|---|---|---|---|
| Target Cell ID | TCI#5 | TCI#6 | TCI#3 | |

FIG. 8C

White Neighbour Cell List (NCL) at eNB2

| Index | 1 | 2 | 3 | ... |
|---|---|---|---|---|
| Target Cell ID | TCI#1 | TCI#3 | TCI#8 | |

Black Neighbour Cell List (NCL) at eNB2

| Index | 1 | 2 | 3 | ... |
|---|---|---|---|---|
| Target Cell ID | TCI#7 | | | |

FIG. 8D updated White NCL at eNB2

| Index | 1 | 2 | 3 | ... |
|---|---|---|---|---|
| Target Cell ID | TCI#1 | TCI#8 | TCI#9 | | updated Black NCL at eNB2

| Index | 1 | 2 | 3 | ... |
|---|---|---|---|---|
| Target Cell ID | TCI#7 | TCI#3 | | |

FIG. 11A

Neighbour Cell List (NCL) at eNB1

| Index | 1 | 2 | 3 | ... |
|---|---|---|---|---|
| Target Cell ID | TCI#2 | TCI#4 | | |

FIG. 11B updated NCL at eNB1

| Index | 1 | 2 | 3 | ... |
|---|---|---|---|---|
| Target Cell ID | TCI#2 | TCI#4 | TCI#3 | |

FIG. 11C

Neighbour Cell List (NCL) at eNB2

| Index | 1 | 2 | 3 | ... |
|---|---|---|---|---|
| Target Cell ID | TCI#1 | TCI#8 | | |

FIG. 11D updated NCL at eNB2

| Index | 1 | 2 | 3 | ... |
|---|---|---|---|---|
| Target Cell ID | TCI#1 | TCI#8 | TCI#3 | |

FIG. 12A

White Neighbour Cell List (NCL) at eNB1

| Index | 1 | 2 | 3 | ... |
|---|---|---|---|---|
| Target Cell ID | TCI#2 | TCI#4 | | |

Black Neighbour Cell List (NCL) at eNB1

| Index | 1 | 2 | 3 | ... |
|---|---|---|---|---|
| Target Cell ID | TCI#5 | TCI#6 | TCI#3 | |

FIG. 12B updated White NCL at eNB1

| Index | 1 | 2 | 3 | ... |
|---|---|---|---|---|
| Target Cell ID | TCI#2 | TCI#4 | TCI#3 | | updated Black NCL at eNB1

| Index | 1 | 2 | 3 | ... |
|---|---|---|---|---|
| Target Cell ID | TCI#5 | TCI#6 | | |

FIG. 12C

White Neighbour Cell List (NCL) at eNB2

| Index | 1 | 2 | 3 | ... |
|---|---|---|---|---|
| Target Cell ID | TCI#1 | TCI#8 | | |

Black Neighbour Cell List (NCL) at eNB2

| Index | 1 | 2 | 3 | ... |
|---|---|---|---|---|
| Target Cell ID | TCI#7 | TCI#3 | | |

FIG. 12D updated White NCL at eNB2

| Index | 1 | 2 | 3 | ... |
|---|---|---|---|---|
| Target Cell ID | TCI#1 | TCI#8 | TCI#3 | | updated Black NCL at eNB2

| Index | 1 | 2 | 3 | ... |
|---|---|---|---|---|
| Target Cell ID | TCI#7 | | | |

FIG. 19A
Neighbour Cell List (NCL) at eNB1
| NR | Target Cell ID | No Remove | No HO | No X2 |
|---|---|---|---|---|
| 1 | TCI#2 | ✓ | | |
| 2 | TCI#3 | ✓ | | |
| 3 | TCI#4 | ✓ | | |
| .. | .. | | | |
FIG. 19B
updated NCL at eNB1
| NR | Target Cell ID | No Remove | No HO | No X2 |
|---|---|---|---|---|
| 1 | TCI#2 | ✓ | | |
| 2 | TCI#3 | ✓ | ✓ | ✓ |
| 3 | TCI#4 | ✓ | | |
| .. | .. | | | |
FIG. 19C
Neighbour Cell List (NCL) at eNB2
| NR | Target Cell ID | No Remove | No HO | No X2 |
|---|---|---|---|---|
| 1 | TCI#1 | ✓ | | |
| 2 | TCI#3 | ✓ | | |
| 3 | TCI#8 | ✓ | ✓ | |
| .. | .. | | | |
FIG. 19D
updated NCL at eNB2
| NR | Target Cell ID | No Remove | No HO | No X2 |
|---|---|---|---|---|
| 1 | TCI#1 | ✓ | | |
| 2 | TCI#3 | ✓ | ✓ | ✓ |
| 3 | TCI#8 | ✓ | ✓ | |
| .. | .. | | | |
FIG. 19E
| NR | TCI# | No Remove | No HO | No X2 |
|---|---|---|---|---|
| 1 | TCI#2 | ✓ | | |
| 2 | TCI#3 | ✓ | | |

FIG. 20A

Neighbour Cell List (NCL) at eNB1

| NR | Target Cell ID | No Remove | No HO | No X2 | No Tx |
|---|---|---|---|---|---|
| 1 | TCI#2 | ✓ | | | |
| 2 | TCI#3 | ✓ | | | |
| 3 | TCI#4 | ✓ | | | |
| .. | | | | | |

FIG. 20B updated NCL at eNB1

| NR | Target Cell ID | No Remove | No HO | No X2 | No Tx |
|---|---|---|---|---|---|
| 1 | TCI#2 | ✓ | | | |
| 2 | TCI#3 | | ✓ | ✓ | ✓ |
| 3 | TCI#4 | ✓ | | | |
| .. | | | | | |

FIG. 20C

Neighbour Cell List (NCL) at eNB2

| NR | Target Cell ID | No Remove | No HO | No X2 | No Tx |
|---|---|---|---|---|---|
| 1 | TCI#1 | ✓ | | | |
| 2 | TCI#3 | ✓ | | | |
| 3 | TCI#8 | ✓ | ✓ | | |
| .. | | | | | |

FIG. 20D updated NCL at eNB2

| NR | Target Cell ID | No Remove | No HO | No X2 | No Tx |
|---|---|---|---|---|---|
| 1 | TCI#1 | ✓ | | | |
| 2 | TCI#3 | ✓ | ✓ | ✓ | ✓ |
| 3 | TCI#8 | ✓ | ✓ | | |
| .. | | | | | |

FIG. 20E

| NR | TCI# | No Remove | No HO | No X2 | No Tx |
|---|---|---|---|---|---|
| 1 | TCI#2 | ✓ | | | |
| 2 | TCI#3 | ✓ | | | |

FIG. 28

| Index | Step size of Tx power down [dBm] | Period [s] |
|---|---|---|
| 1 | Fixed with x1 | Fixed with T1 |
| 2 | Fixed with x1 | Fixed with T2 |
| 3 | Fixed with x1 | T1, T2, T3, .. (in order) |
| : | : | : |
| i | Fixed with x2 | Fixed with T1 |
| i+1 | Fixed with x2 | Fixed with T2 |
| i+2 | Fixed with x2 | T1, T2, T3, .. (in order) |
| : | : | : |
| j | x1, x2, x3, ..., xN (in order) | Fixed with T1 |
| j+1 | x1, x2, x3, ..., xN (in order) | Fixed with T2 |
| : | : | : |

FIG. 29

| Index | Step size of tilt angle down [degree] | Period [s] |
|---|---|---|
| 1 | Fixed with A1 | Fixed with T1 |
| 2 | Fixed with A1 | Fixed with T2 |
| 3 | Fixed with A1 | T1, T2, T3, .. (in order) |
| : | : | : |
| i | Fixed with A2 | Fixed with T1 |
| i+1 | Fixed with A2 | Fixed with T2 |
| i+2 | Fixed with A2 | T1, T2, T3, .. (in order) |
| : | : | : |
| j | A1, A2, A3, …, AN (in order) | T1, T2, T3, .. (in order) |
| : | : | : |

RADIO COMMUNICATION SYSTEM, RADIO COMMUNICATION METHOD, RADIO BASE STATION AND CONTROL STATION

REFERENCE TO RELATED APPLICATION

This application is a continuation of application Ser. No. 13/256,123 filed Sep. 12, 2011, which is based upon and claims the benefit of the priority of Japanese patent application No. 2009-061470 filed on Mar. 13, 2009, the disclosure of which is incorporated herein in its entirety by reference thereto.

TECHNICAL FIELD

This invention relates to a radio communication system having a plurality of radio base stations and a control station, in which the control station optimizes the setting at the radio base stations other than a specified one of the radio base stations in response to state control at the specified radio base station.

BACKGROUND

In these days, researches and developments for power saving from the perspective of Green IT (Information Technology) are conducted actively.

In Patent Document 1, there is a proposal on transmission power controlling method at one or more radio base stations arranged in each of a plurality of service areas of a mobile communication system in which radio communication is carried out between the radio base station and a mobile station. The mobile communication system is presupposed to be a PHS (Personal Handy-phone System) which is a simplified mobile phone system that uses a micro-cell. The radio base station is configured to receive a signal sent from the other radio base station(s) to control the transmission power at its own station based on the relationship between the information concerning the state of communication in the other radio base station(s) as derived from the received signal and the power of the signal received from the other radio base station(s).

More specifically, the radio base station monitors
 traffic status at neighboring radio base stations, and
 received power from neighboring radio base stations.

The radio base station performs control to decrease the transmission power if the monitored result indicates that the received power at its own radio base station from another base station (neighboring radio base station) exceeds a predetermined required threshold value and such another radio base station is in a low traffic situation.

If the radio base station of interest decreases its transmission power, but the received power from the other radio base station exceeds the required threshold value, a mobile terminal engaged in communication with the radio base station is able to hand over to the other radio base station. Hence, call disconnection is not happened, thus presenting no problem.

Thus, with the transmission power controlling method for the radio base station of Patent Document 1, each radio base station is able to autonomously control the stop and start of transmission in keeping with each surrounding status. It is thus possible with the transmission power controlling method for the radio base station of Patent Document 1 to flexibly deal with considering the traffic states to achieve power saving.

On the other hand, from the perspective of reducing the operation cost (OPEX), researches and developments on SON (Self Organizing Network) in a radio communication system, are actively carried out.

SON has the following functions:
 self-configuration;
 self-optimization;
 self-healing; and so forth.

Techniques that will accomplish respective different objectives (Non-Patent Documents 1 and 2) are under study.

In Non-Patent Document 1, optimization of the radio parameter is introduced as one of the SON techniques. It is intended to achieve different objectives such as
 maximizing throughput characteristic;
 minimizing delay;
 maximizing network capacity; and
 maximizing coverage.

Examples of radio parameters include
 transmission power of a base station;
 antenna tilt angle of a base station;
 neighbor cell information; and
 handover parameter.

One or more of these radio parameters is changed where appropriate in order to achieve the above mentioned objectives.

In Patent Document 2, there is disclosed a configuration in which, in case a radio base station (6*f*) is newly installed, the radio base station (6*f*) sends information indicating a status of the own station (6*f*) to a neighboring base station (6*e*) that most strongly received a perch channel from another radio base station. The information indicating the status of the own station (6*f*) includes a use frequency information or a location information, for example, and is sent over a channel that may be received by another radio base station, such as over a common control channel. The neighboring base station (6*e*) receives this information to take out therefrom the information that represents the status of the radio base station (6*f*) to notify to the other neighboring base stations (6*a* to 6*d*) the information regarding the newly installed radio base station (6*f*) via a base station control station (3*e*). These neighboring base stations (6*a* to 6*d*) autonomously update databases of neighboring zone information that they hold, i.e., neighboring zone information needed for a mobile station to switch a channel, by way of updating a neighboring zone table by addition of the radio base station 6*f*. The neighboring base stations broadcast updated neighboring zone information to each mobile station over a multicast channel which is a downlink common control channel. In this manner, each mobile station is able to recognize the presence of the radio base station (6*f*) to wait in a radio zone of the radio base station (6*f*) or to switch to a channel for the radio base station (6*f*). In Patent Document 2, in case a base station is newly installed or removed (after operation), it sends a notification regarding new installation or removal to the neighboring base station(s) over a radio path to allow addition to or removal from the neighboring zone tables.

PATENT DOCUMENT

Patent Document 1:
 JP Patent Kokai Publication No. JP-P2003-037555A
Patent Document 2:
 JP Patent Kokai Publication No. JP-A-11-215552

Non-Patent Document

Non-Patent Document 1:
NGMN technical documents: Use Cases related to Self Organizing Network (Internet <URL> http://www.ngm-n.org/uploads/media/NGMN_Use_Cases_Self_Organising_Network_2_02.pdf)
Non-Patent Document 2:
3GPP TS36.300 v8.7.0 22.3.2a (Internet <URL> http://www.3gpp.org/ftp/Spec s/html-info/36300.htm)
Non-Patent Document 3:
3GPP TS36.902 v1.0.1 4.2 (Internet <URL> http://www.3gpp.org/ftp/Spec s/html-info/36902.htm)

SUMMARY

An analysis of the related techniques by the present invention is the following:

In transmission power control in a radio base station with the above mentioned related techniques, each radio base station performs independent transmission power control in accordance with information concerning surrounding environment as measured by the own station and a pre-set threshold value. As a result, in the related techniques, the effect of changing transmission power and in particular, switching off the transmission influences neighboring base stations.

As an example, it is presupposed that, in a cellular system having a self-optimizing function, a certain radio base station autonomously controls the transmission power to switch off its transmission. Following describes the result of investigation by the present inventor:

If, at a specified time point, a radio base station (radio base station A) autonomously switches transmission off, the fact that the radio base station A switches transmission off is not notified to other radio base stations (a set of radio base stations B) respectively managing cells neighboring to a cell of the radio base station A.

Hence, the set of radio base stations B each detects that it is necessary to reconfigure radio parameters of the own station only when it is unable to receive (detect) a signal sent from the radio base station A. The set of radio base stations B then proceeds to optimize the radio parameters of the own station, respectively.

Other radio base stations (a set of radio base stations C) managing cells neighboring to the cells of the set of radio base stations B are similarly influenced by the reconfiguration of the radio parameters in the set of radio base stations B, and thus proceed to optimize the radio parameters of the own stations.

That is, the effect due to the control of the transmission power (transmission off) based on the self decision of the radio base station A is spread to the neighboring radio base stations B and further the neighboring base stations C and so on.

In addition, the set of radio base stations B, which once changed the radio parameters for optimization, has to proceed to change its radio parameters again. It is because the radio base stations B is influenced by the change of the radio parameters that has been made to optimize the set of radio base stations C. Such re-changing of the radio parameters is estimated to occur one after another between respective neighboring radio base stations.

In this case, the system-wide optimization of the radio parameters will not end up with convergence, that is, it will take much time before ultimately arriving at optimization of the radio parameters. Hence, a delay from a time point when the radio base station A switches the transmission off to a time point when optimization of radio parameters in the neighboring base stations is completed may be of a problem. That is, in case the radio base station A autonomously switches the transmission off, it is desirable for the radio parameters in the neighboring base stations to be efficiently reconfigured to respective optimum values (knowledge obtained by the present inventor).

In addition, a time period during which the radio parameters are configured at inappropriate values is unavoidably included in the time period from the transmission off of the radio base station A until completion of optimization of the radio parameters in the neighboring base stations. As a result, several problems are thought to be incurred. For example, if transmission power and antenna tilt angle are inappropriate, interference between neighbor cells will be increased; and if neighbor cell information is inappropriate, it is likely that unneeded measurements may be performed by radio terminals (mobile stations) (knowledge obtained by the present inventor).

Similar problems may be thought to arise in case a radio base station transits from transmission off state to transmission on state. In case a radio base station executes state control, it is desirable to implement a system configuration in which radio parameters in neighboring base stations will be efficiently self-optimized (knowledge obtained by the present inventor).

It is therefore an object of the present invention to provide a radio communication system, a radio communication method, a radio base station and a control station, in which, when a radio base station executes state control, it is possible to set radio parameters in the neighboring base stations efficiently at respective appropriate values.

The present invention provides a radio communication system, a radio communication method, a radio base station, a control station, and a program (or a computer-readable recording medium having the program stored therein) which may be stated as follows, but not limited thereto.

According to the present invention, there is provided a radio communication system comprising: a plurality of radio base stations; and a control station connected to the radio base stations. In the radio communication system, on occurrence of a trigger for execution of state control of a first radio base station of said radio base stations in said first radio base station, said first radio base station notifies state control information including information regarding said state control to at least one out of said control station and other radio base stations than said first radio base station, before or at a time of start of said state control or in an execution step of said state control. The control station notifies at least one of management information regarding a radio parameter to be updated in accordance with said state control and said state control information to at least a second radio base station out of said radio base stations that are connected to said control station, said second radio base station managing at least a cell neighboring to a cell of said first radio base station.

According to the present invention, there is provided a radio communication method in a radio communication system having a plurality of radio base stations and a control station that prescribes the operation of the radio base station and that of the control station. In the radio communication method, on occurrence of a trigger to prompt performing state control of a first one of the radio base stations in the first one of the radio base stations, the first radio base station notifies state control information including information regarding said state control to at least one out of the control station and other radio base stations than the first radio base station, before or at a time of start of the state control or in a step of performing the state control. The state control information is the information regarding the state control. The control station sends to at least a second one of the radio base stations one or both of the state control information regarding the first radio base station and the management information regarding a radio parameter to be updated in accordance with the state control of the first radio base station. The second radio base station manages a cell neighboring to a cell of the first radio base station.

According to the present invention, there is also provided a radio base station comprising a means that notifies, on occurrence of a trigger for execution of state control of said radio base station, state control information including information regarding the above mentioned state control to at least one out of a control station and the other radio base stations, before or at a time of start of the state control or in an execution step of the state control.

According to the present invention, there is also provided a control station which, on receiving state control information from a first radio base station, sends to at least a second radio base station one or both of the state control information regarding the first radio base station and management information regarding a radio parameter to be updated in accordance with the state control of the first radio base station. The second radio base station manages a cell neighboring to a cell of the first radio base station. The state control information is the information regarding the state control.

According to the present invention, there is also provided a program causing a computer that composes a radio base station to execute the processing of the radio base station (or a computer-readable recording medium that has stored the program therein). According to the present invention, there is further provided a program causing a computer that composes the control station to execute the processing of the control station (or a computer-readable recording medium that has stored the program therein).

According to the present invention, in case a radio base station performs state control, radio parameters in neighboring base stations may efficiently be set to respective appropriate values.

Still other features and advantages of the present invention will become readily apparent to those skilled in this art from the following detailed description in conjunction with the accompanying drawings wherein only exemplary embodiments of the invention are shown and described, simply by way of illustration of the best mode contemplated of carrying out this invention. As will be realized, the invention is capable of other and different embodiments, and its several details are capable of modifications in various obvious respects, all without departing from the invention. Accordingly, the drawing and description are to be regarded as illustrative in nature, and not as restrictive.

BRIEF DESCRIPTION OF THE DRAWINGS

FIGS. 7A to 7D are diagrams showing neighbor cell lists in the first 335 exemplary embodiment of the present invention.

FIGS. 8A to 8D are diagrams showing further neighbor cell lists in the first exemplary embodiment of the present invention.

FIG. 9 is a diagram showing an example control sequence in case a radio base station in the first exemplary embodiment of the present invention switches transmission on.

FIG. 10 is a diagram showing another example control sequence in case a radio base station in the first exemplary embodiment of the present invention switches transmission on.

FIGS. 11A to 11D are diagrams showing neighbor cell lists according to the first exemplary embodiment of the present invention.

FIGS. 12A to 12D are diagrams showing further neighbor cell lists according to the first exemplary embodiment of the present invention.

FIGS. 19A to 19E are diagrams showing neighbor cell lists in the second exemplary embodiment of the present invention.

FIGS. 20A to 20E are diagrams showing further neighbor cell lists in the second exemplary embodiment of the present invention.

FIG. 28 is a diagram showing an example stepwise control of power down in the exemplary embodiments of the present invention.

FIG. 29 is a diagram showing an example stepwise control of an antenna tilt angle in the exemplary embodiments of the present invention.

PREFERRED MODES

In one of preferred modes of the present invention, when a trigger to execute state control of a radio base station occurs in a first radio base station, state control information that is information regarding state control, is notified to at least one of a control station and other radio base stations other than the first radio base station, before or at a time of start of the state control or in an execution step of the state control. The control station transmits to at least a second radio base station one or both of the state control information regarding the first radio base station and the management information regarding a radio parameter to be updated in accordance with the state control of the first radio base station. The second radio base station manages a cell neighboring to a cell of the first radio base station. According to the present invention, a radio parameter of the own station may efficiently be configured to an appropriate value even in case a radio base station other than the own station, located in the surrounding area of a cell of the own station, has executed state control (That is, self-optimization may be implemented). A radio communication system (a mobile communication system) according to one of exemplary embodiments of the present invention will now be described. Although the present radio communication system has a preferred configuration conforming to the specification of '3GPP LTE (3GPP Long Term Evolution), but not limited to this specification.

<Outline Configuration of First Radio Communication System>

Figure 1:
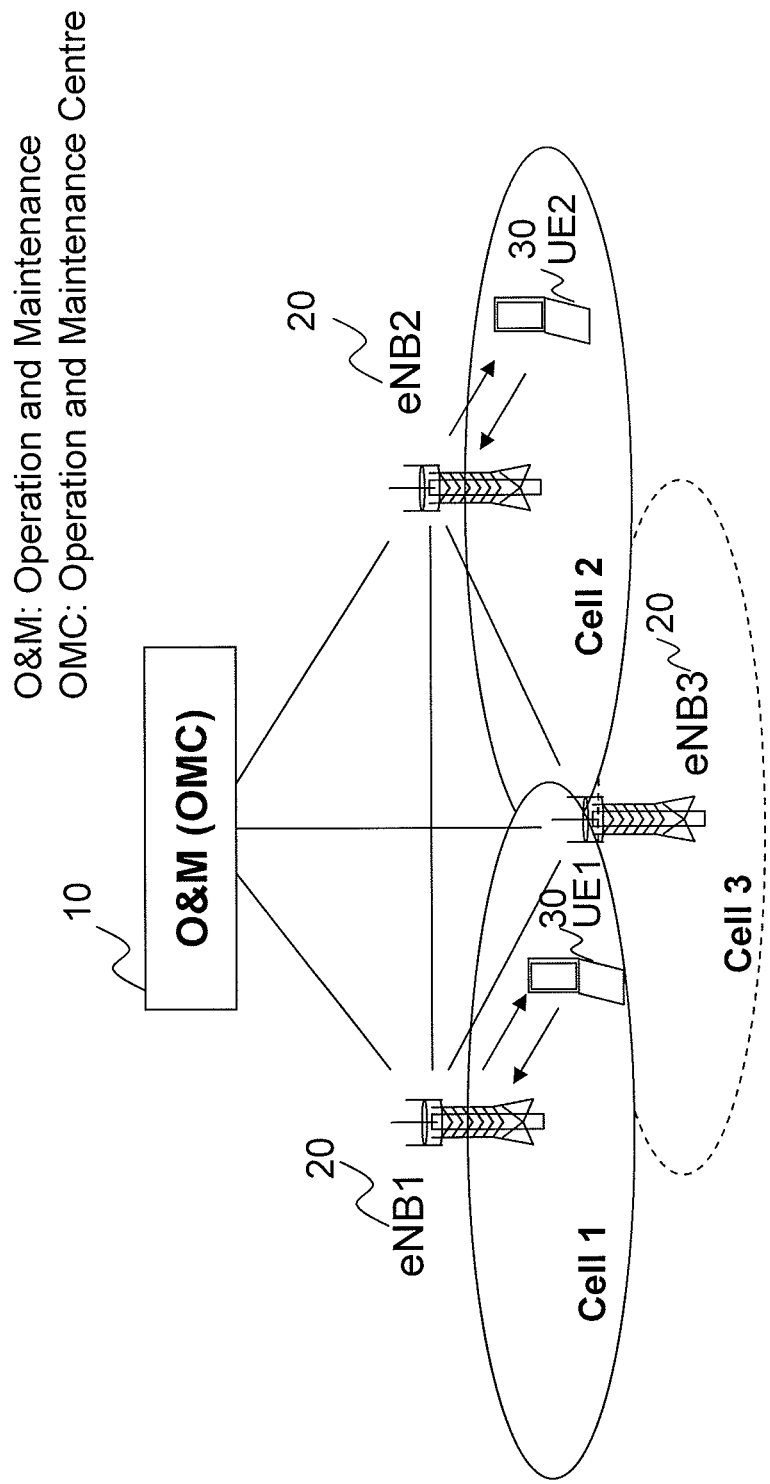
FIG. 1 is a diagram showing a configuration of a radio communication system according to an exemplary embodiment of the present invention.
Figure 2:
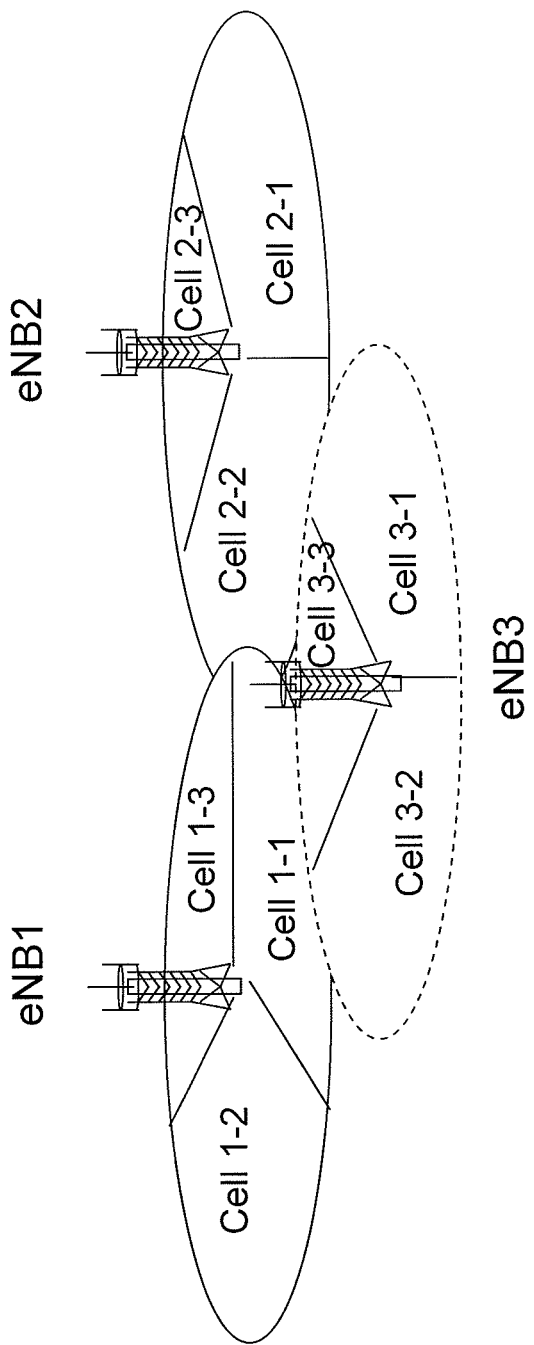
FIG. 2 is a diagram showing a cell configuration different from that of the radio communication system of the exemplary embodiment of the present invention.

FIG. 1 is a diagram schematically illustrating an example configuration of a radio communication system according to one of exemplary embodiments of the present invention. The radio communication system includes radio base stations 20 (eNB: evolved Node B or E-UTRAN (E-UTRAN: Evolved UTRAN) Node B) eNB1, 425 eNB2 and eNB3, an O&M 10 (Operation and Maintenance server), which is a control station managing the radio base stations 20, and which is also termed an OMC (Operation Maintenance Center), and radio terminals 30 (UE: User Equipment) UE1 and UE2. It is presupposed that the radio base stations eNB1, eNB2 and eNB3 are managing a cell 1, a cell 2 and a cell 3, respectively, and that the UE1 and the UE2 are located in the cell 1 and the cell 2, respectively. In FIG. 1, the UE1 and the UE2 are located in the cell 1 and the cell 2, respectively, only for illustration, and it is a matter of course that there is no limitation in the UEs' locations.

It is noted that in case the radio base stations eNB1, eNB2 and eNB3 respectively manage a plurality of sectorized cells, that is, cell 1-1 to cell 1-3, cell 2-1 to cell 2-3 and cell 3-1 to 3-3, the present invention may be applied without loss of generality of the invention. Here, the explanation will be premised on the configuration of FIG. 1 only for simplifying the explanation.

Exemplary Embodiment 1

Figure 3:
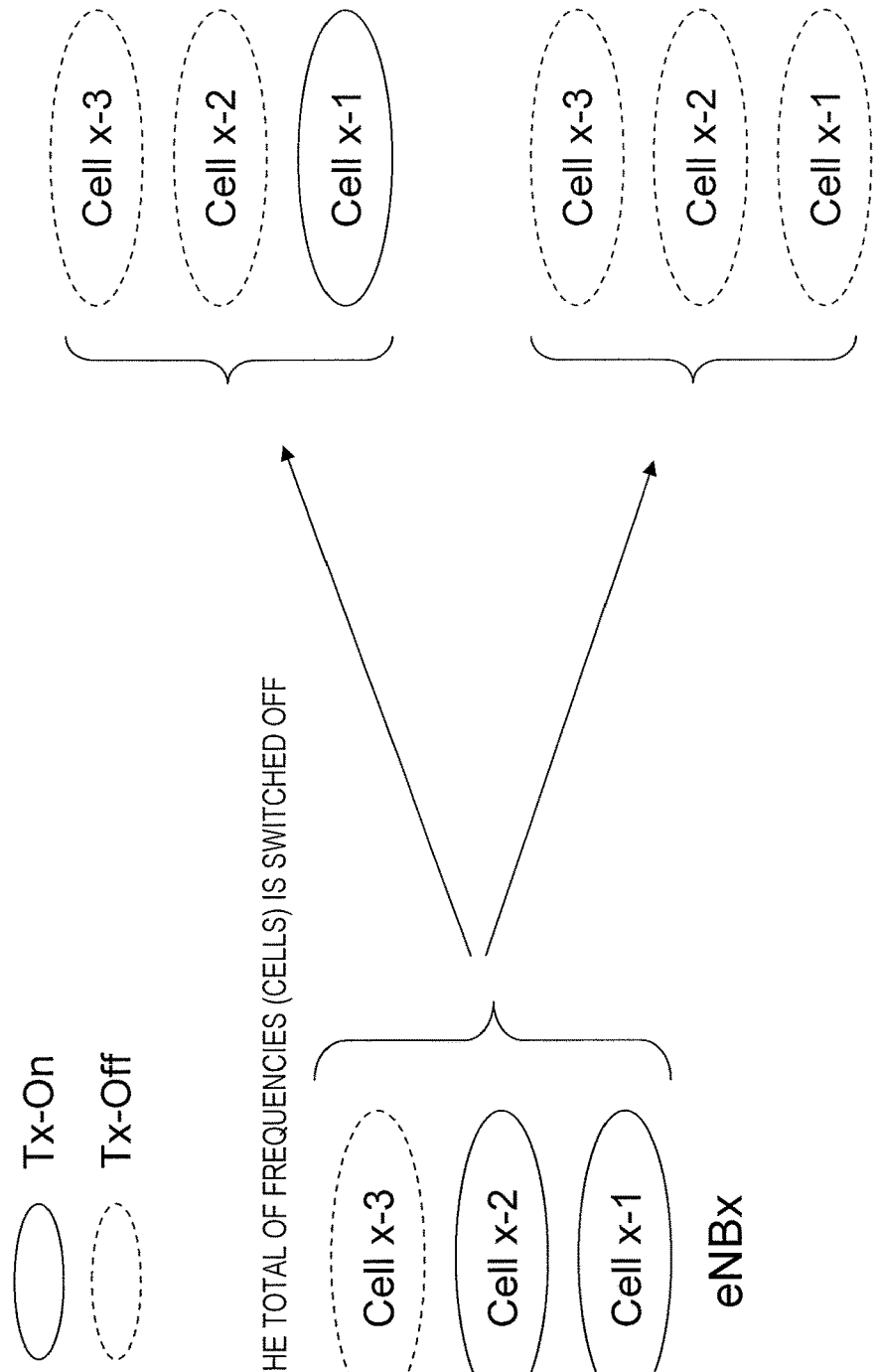
FIGS. 3A and 3B are diagrams showing a case of transmission off of a radio base station according to the exemplary embodiment of the present invention.

In the following, it is presupposed that the radio base station eNB3 executes sleep and wakeup as state control examples. That is, transmission in the cell 3 managed by the radio base station eNB3 is switched off (Tx-off) to carry out sleep and switched on (Tx-on) to carry out wakeup. It is noted that, when it is stated here that the transmission is switched off, there are two cases, namely (a) a case where transmission on a specified frequency (cell) managed by a certain radio base station is switched off, and (b) a case where transmission on all the frequencies (cells) managed by a certain radio base station is switched off, as shown in FIGS. 3A and 3B. The following explanation is premised on the case (b), however, it is to be understood that the case (a) is equally valid for the present invention.

Figure 4:
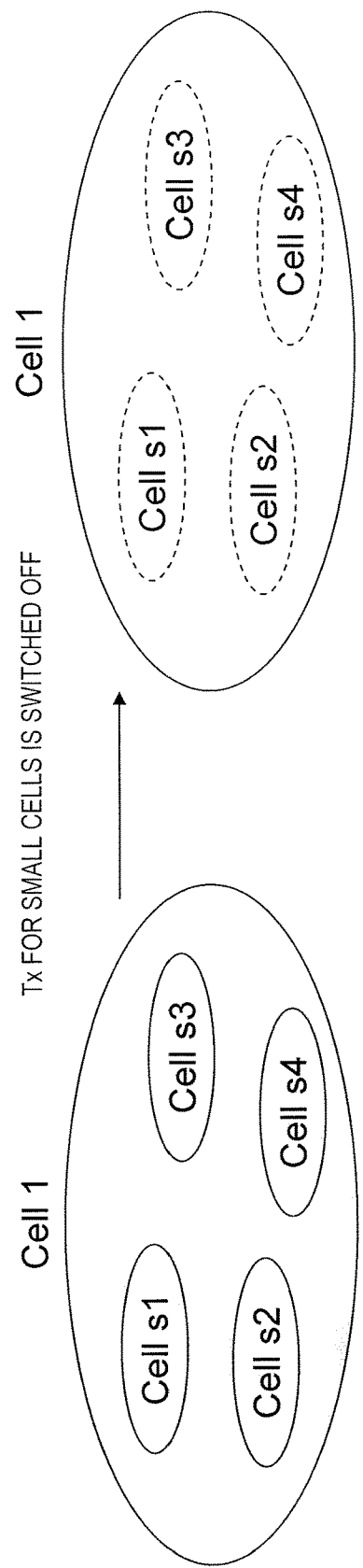
FIG. 4 is a diagram showing another case of transmission off of the radio base station according to the exemplary embodiment of the present invention.

In the exemplary embodiment of the present invention, not only the case of FIG. 1, but also the case of FIG. 4 is applicable. In the case of FIG. 4, cells different in size, such as macro-cells and micro-cells, are overlapped with one another and, for example, transmission for the small-size cells (cells 1, 2, 3 and 4) is to be switched off (Tx-off). The same may be said of a case where transmission for the small-size cells is to be switched on (Tx-on).

FIGS. 5 to 14 illustrate a first exemplary embodiment of the present invention. Following describes the present exemplary embodiment more specifically with reference to FIGS. 1 and 5 to 14.

In the present exemplary embodiment, it is assumed that transmission in the cell managed by the radio base station eNB3 (cell 3 of FIG. 1) is to be switched off (TX-off) or switched on (Tx-on). In this case, the O&M (OMC) instructs the radio base stations eNB1 and eNB2 to remove the corresponding cell (cell 3) from their neighbor cell lists or to add the corresponding cell (cell 3) to the lists, which are maintained by the radio base stations eNB1 and eNB2, respectively. The radio base stations eNB1 and eNB2 are the neighbor base stations with respect to the cell managed by the radio base station eNB3.

Figure 5:
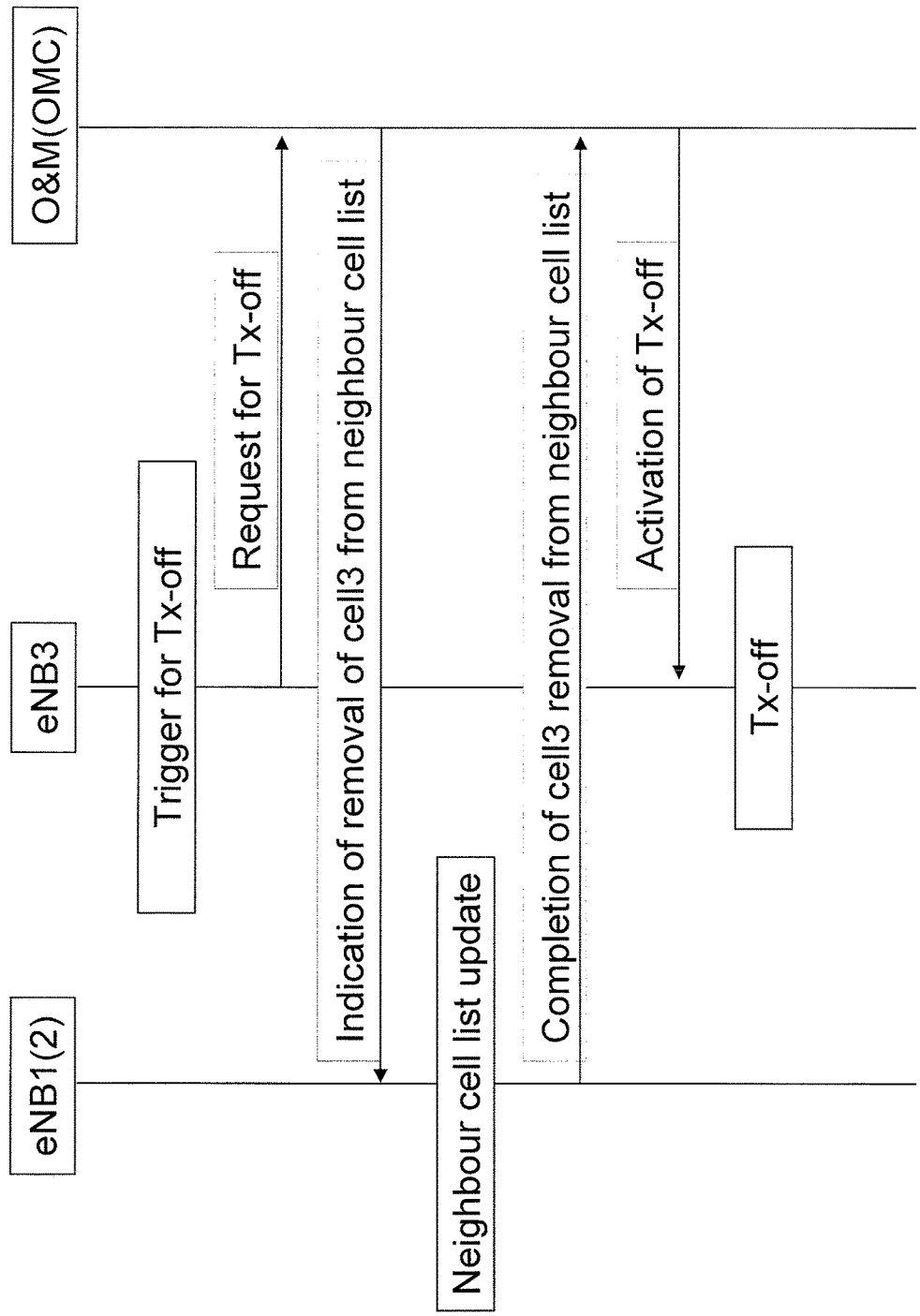
FIG. 5 is a diagram showing an example control sequence in case the radio base station of a first exemplary embodiment of the present invention switches transmission off.

FIG. 5 shows a procedure of controlling the neighbor cell list in case transmission by the radio base station eNB3 is to be switched off (Tx-off). In the sequence diagram of FIG. 5, a vertical line denotes time. For each of eNB1 (2), eNB3 and O&M (OMC), a box denotes processing, and an arrow along a horizontal line denotes the information (message) sent from a transmission source to a transmission destination, with the arrow pointing to the destination. The same applies for other sequence diagrams as well.

The eNB3 detects, from the following states, that the situation is such as the transmission is able to be switched off. Those states include:

a state where the number of terminals which are communicating with the eNB3 in the own cell (cell 3) is not equal to or larger than a preset threshold value; or a state where the number of terminals which are in an active state is not equal to or larger than a preset threshold value; and a state where received signal strength of signals from neighboring base stations is high such that, even if transmission in the own cell (cell 3) is switched off, the neighboring base stations are able to cover the area of the own cell (cell 3) (see 'Trigger for Tx-off' of FIG. 5).

Hence, the eNB3 requests the O&M (OMC) to switch the transmission in the own cell (cell 3) off (See "Request for Tx-off"). It is noted that the request to switch off transmission corresponds to the state control information.

The trigger to detect that the situation is such as allows for switching transmission off may be other than those shown above. For example, a given radio base station may make a decision if transmission is able to be switched off depending on whether or not a terminal or a set of terminals allowed to be connected to the own station (CSG: Closed Subscriber Group) exist in the own cell or a neighbor cell of the own cell. Further, the trigger may be configured to be applied at a preset time point.

The Q&M (OMC) indicates to the neighbor radio base stations eNB1 and eNB2 that the cell 3 is to be removed from the neighbor cell list because the base station eNB3 is going to switch off the transmission in the own cell (cell 3), by way of the management information transfer (see 'Indication of removal of cell 3 from the neighbor cell list' of FIG. 5).

The radio base stations eNB1 and eNB2 update the neighbor cell lists they maintain by removing the cell 3 (see 'Neighbor cell list update' of FIG. 5) and notify the Q&M (OMC) of the completion of update of the neighbor cell lists (see 'Completion of cell 3 removal from the neighbor cell list' of FIG. 5).

The Q&M (OMC) notifies the radio base station eNB3 that switching transmission off in the cell 3 is now allowed (see 'Activation of Tx-off' of FIG. 5). The radio base station eNB3 accordingly switches off transmission in the own cell (cell 3) (see 'Tx-off' of FIG. 5).

When the radio base station eNB3 switches off transmission in the own cell (cell 3), transmission may be switched off instantaneously in the eNB3, or, transmission power may be reduced in a stepwise manner or antenna tilt angle may be down-tilted in a stepwise manner. FIGS. 28 and 29 show example cases where the transmission power is reduced or the antenna tilt angle is down-tilted in a stepwise manner.

FIG. 28 shows the relationship among indices (Index), the step size of Tx power reduction (Step size of Tx power down) and the period of the power down steps (Period). In FIG. 28, desired values are set in x1, x2, x3, . . . , xN, which stand for the step sizes of Tx power down, and in T1, T2, T3, which stand for the periods of the power down steps. By having the relationship (information) of FIG. 28 stored as tables in the Q&M (OMC) and in the radio base stations, the radio base stations which have to reduce the transmission power may be informed of how to reduce the transmission power, provided that the radio base stations are informed by the Q&M (OMC) of relevant index numbers. If, in the case of FIG. 28, the index is 1, the transmission power is reduced by a fixed value x1 per period T1, that is, during a time interval T1. If then index is 3, the transmission power is reduced by a fixed value x1 for each of the time intervals T1, T2, T3, . . . , of different lengths in the order of the periods T1, T2, T3. If the index is j, the transmission power is reduced by x1 during the first period T1 and by x2 during the second period T2 and so forth, such that both the lengths of the periods and the step sizes of the power reduction are varied.

The same method may be applied for said of the antenna tilt angle. In the case of FIG. 29, there is shown the relationship among indices (Index), the step sizes of antenna tilt down (Step size of tilt down) and the periods of the tilt down steps (Period). In FIG. 29, desired values of the step size of the antenna tilt down are set at A1, A2, A3, . . . , AN, and desired values of the periods of the antenna tilt down steps are set at T1, T2, T3, . . . . If the index is 1, the antenna tilt is down-tilted by a fixed value A1 for the period T1, that is, every time length T1. If the index is 3, the antenna tilt is down-tilted by a fixed value A1 for each of the time intervals T1, T2, T3, . . . , in the order of periods of different lengths T1, T2, T3. If the index is j, the transmission power is reduced by A1 during the first period T1, by A2 during the next period T2, and so forth, such that both the lengths of the periods and the step sizes of the antenna tilt down are varied.

In this method, the transmission power reduction or the antenna tilt down is not executed instantaneously, but is executed in a stepwise manner. It is thus possible to prevent that, at a terminal placed under management by the base station, whose transmission is to be switched off, the transmission quality is rapidly degraded or t call disconnection is happened because of the abrupt change of propagation characteristics. It is noted that the transmission power increase or the antenna tilt up may be executed in a manner similar to the case of the transmission power reduction or the antenna tilt down, respectively.

After updating the neighbor cell list, the radio base stations eNB1 and eNB2 may broadcast or unicast to terminals in the own cells the information which needs to be informed in accordance with the update of the lists.

Example of the information to be sent to these terminals include updated neighbor cell list, also referred to as NCL;
update information of the neighbor cell list;
the maximum value of transmission power;
handover parameters,
cell reselection parameters; or
other radio parameters.

The terminal updates radio parameters in accordance with the information broadcast or unicast from the radio base station.

The intention of a given radio base station transmitting the maximum value of the transmission power to the terminal may be such that, when the given radio base station switches off the transmission, the neighboring base stations are to be allowed to increase the transmission power by a maximum value to increase respective coverage area.

As handover parameters, measurement report threshold value (Measurement report threshold),
cell specific offset of the serving cell,
frequency specific offset of a serving frequency,
cell specific offset of a neighbor cell (cell Individual Offset),
serving cell quality threshold value,
serving cell quality as a trigger for a terminal to decide whether or not measurement is to be carried out (s-Measure),
quality (trigger Quality) to trigger performing measurement report,
hysteresis used to decide whether or not a measurement report is to be performed, and the like may be used.

These parameters are also parameters relevant to measurement (Measurement) at a terminal, and hence may also be said to be measurement (Measurement) parameters.

As cell reselection parameters, quality offset of the serving cell and the neighbor cell (q-Offset Cell),
quality offset of the serving frequency and other frequencies (q-Offset Freq) and cell reselection priority (Cell reselection Priority), for example, may be used.

Adjustment of the handover parameters or the cell reselection parameters helps promote ease in movement of terminals from a cell where transmission is switched off to neighbor cells or in reselection of the neighbor cell by the terminal itself.

In the present exemplary embodiment, the neighbor cell list in a neighboring base station may properly be updated without delay, by following the above procedure, even in case a given radio base station switches transmission off.

In the above mentioned sequence example, shown in FIG. 5, the O&M (OMC) indicates the neighboring base stations eNB1 and eNB2 of the neighbor cell list update (removal of cell 3) (see 'Indication of removal of cell 3 from neighbor cell list' of FIG. 5). However, in the present exemplary embodiment, not only update of the neighbor cell list but update of other radio parameters, may be indicated as management information, as shown in FIG. 6 (see 'Indication of removal of cell 3 from neighbor cell list and updated other radio parameter information' of FIG. 6).

Figure 6:
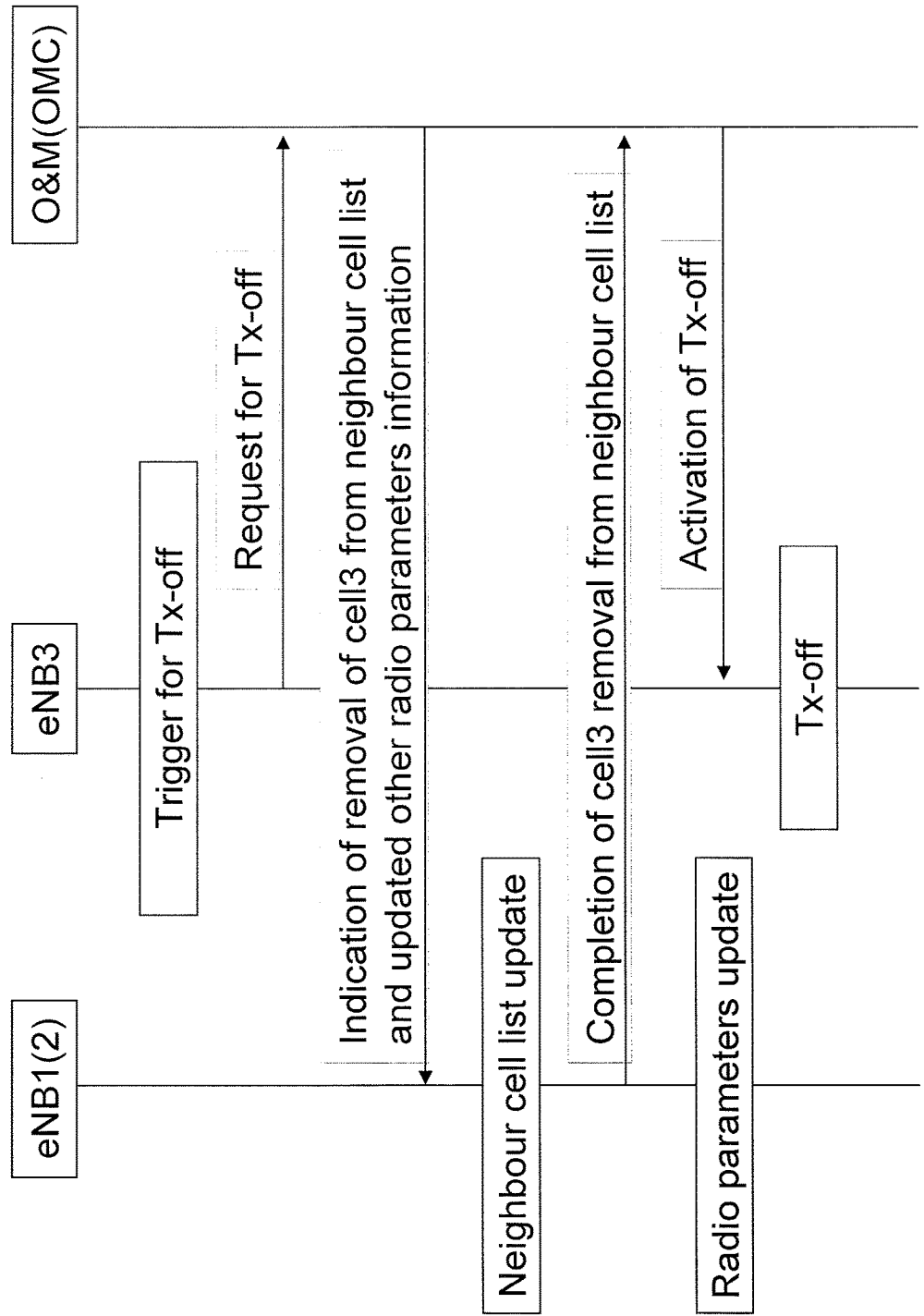
FIG. 6 is a diagram showing another control sequence in case the radio base station of the first exemplary embodiment of the present invention switches transmission off.

At this time, the eNB1 and eNB2 notify the O&M (OMC) of the update of the neighbor cell list (see 'Completion of cell 3 removal from neighbor cell list' of FIG. 6), after which the eNB1 and eNB2 update the radio parameters (see 'Radio parameter update' of FIG. 6).

The radio base station eNB1 and eNB2 notify the terminals of the update of the radio parameters as necessary.

Example of the radio parameters, other than the neighbor cell list, include as follows:
 transmission power (maximum value or relative values of increase/decrease);
 antenna tilt angle;
 handover parameters; and
 cell reselection parameters.

The radio base stations eNB1 and eNB2 may update the radio parameters other than the neighbor cell list after, at the same time as or before updating the neighbor cell list (see 'Neighbor cell list update' of FIG. 6). Or, the O&M may indicate to the eNB1 and eNB2 that other radio parameters are to be updated at the same time as, immediately before or immediately after allowing the eNB3 to switch off transmission. The radio base stations eNB1 and eNB2 may then accordingly update the corresponding radio parameters.

The radio base stations eNB1 and eNB2 may update the transmission power or the antenna tilt angle instantaneously or stepwise (see 'Radio parameters update' of FIG. 6).

The O&M (OMC) may notify the eNB3 of the update of the radio parameters immediately after receiving the request for Tx-off or at the same time as the activation (Activation) of Tx-off. The radio parameters at this time may be the above mentioned radio parameters.

FIGS. 7A-7D and FIGS. 8A-8D illustrate update of the neighbor cell list (NCL).

FIGS. 7A-7D show examples neighbor cell lists (NCLs), maintained by the eNB1 and eNB2, as explained with reference to FIGS. 1, 5 and 6. The neighbor cell list includes an indices (Index) and target cell identifiers (Target Cell IDs: TCIs) associated with the indices.

FIGS. 7A, 7C indicate neighbor cell lists of the eNB1 and eNB2 before the eNB1 and eNB2 are indicated from the O&M (OMC) that the cell 3 is to be removed from the neighbor cell list because the eNB3 switches transmission in the cell 3 off.

Referring to FIG. 7A, the eNB1 recognizes TCI#2, TCI#3, TCI#4 and TCI#8 as neighbor cells. It is noted however that TCI#8 is not shown in FIG. 7A. As the TCIs, a global cell identity (Global Cell ID) or a physical cell identity (Physical Cell Identity) of the target cell is normally used. It is however here assumed that TCI#x denotes cell x for simplicity.

In similar manner, in FIG. 7C the eNB2 recognizes TCI#1, TCI#3, TCI#8 and TCI#9 as neighbor cells. It is noted however that TCI#9 is not shown in FIG. 7C.

When notified from the O&M (OMC) that the cell 3 is to be removed, the eNB1 and eNB2 remove TCI#3, equivalent to the cell 3, from the respective neighbor cell lists, as shown in FIGS. 7B and 7D. In this case, the TCI#3 may be removed and the succeeding TCIs# may be sequentially shifted towards left for padding, or the space so far occupied by the TCI#3 may be left void.

FIGS. 8A-8D show other examples of the neighbor cell lists maintained by the eNB1 and eNB2.

In each of the eNBs, a white neighbor cell list (White Neighbor Cell list) where access is allowed for a terminal, and a black neighbor cell list (Black Neighbor Cell list), where access is not allowed for a terminal, are separately provided. Each of the white and black neighbor cell lists includes index and target cell identifier (TCI) associated with the index. FIGS. 8A and 8C indicate neighbor cell lists of the eNB1 and eNB2 before the eNB1 and eNB2 are indicated from the O&M (OMC) that the cell 3 is to be removed from the neighbor cell list because the eNB3 switches transmission in the cell 3 off.

Referring to FIG. 8A, the eNB1 recognizes TCI#2, TCI#3, TCI#4 and TCI#8 as neighbor cells of the white neighbor cell list. It is noted that, in FIG. 8A, TCI#8 is not shown. The eNB1 also recognizes TCI#5 and TCI#6 as neighbor cells of the black neighbor cell list.

In similar manner, referring to FIG. 8C, the eNB2 recognizes TCI#1, TCI#3, TCI#8 and TCI#9 as neighbor cells of the white neighbor cell list. It is noted that, in FIG. 8C, TCI#9 is not shown. The eNB2 also recognizes TCI#7 as a neighbor cell of the black neighbor cell list.

When the eNB1 and eNB2 are notified by the O&M (OMC) that the cell 3 is to be removed, TCI#3 is removed from the respective white neighbor cell lists, as shown in FIGS. 8B and 8D, while TCI#3 is added to each of the respective black neighbor cell lists.

At this time, TCI#3 may be added to an end of the black neighbor cell list, in the cell number order (in an ascending order or a descending order) or in the order of the quality as informed from the terminal (in an ascending order or a descending order). It may also be added in any other suitable manner.

Figure 9:
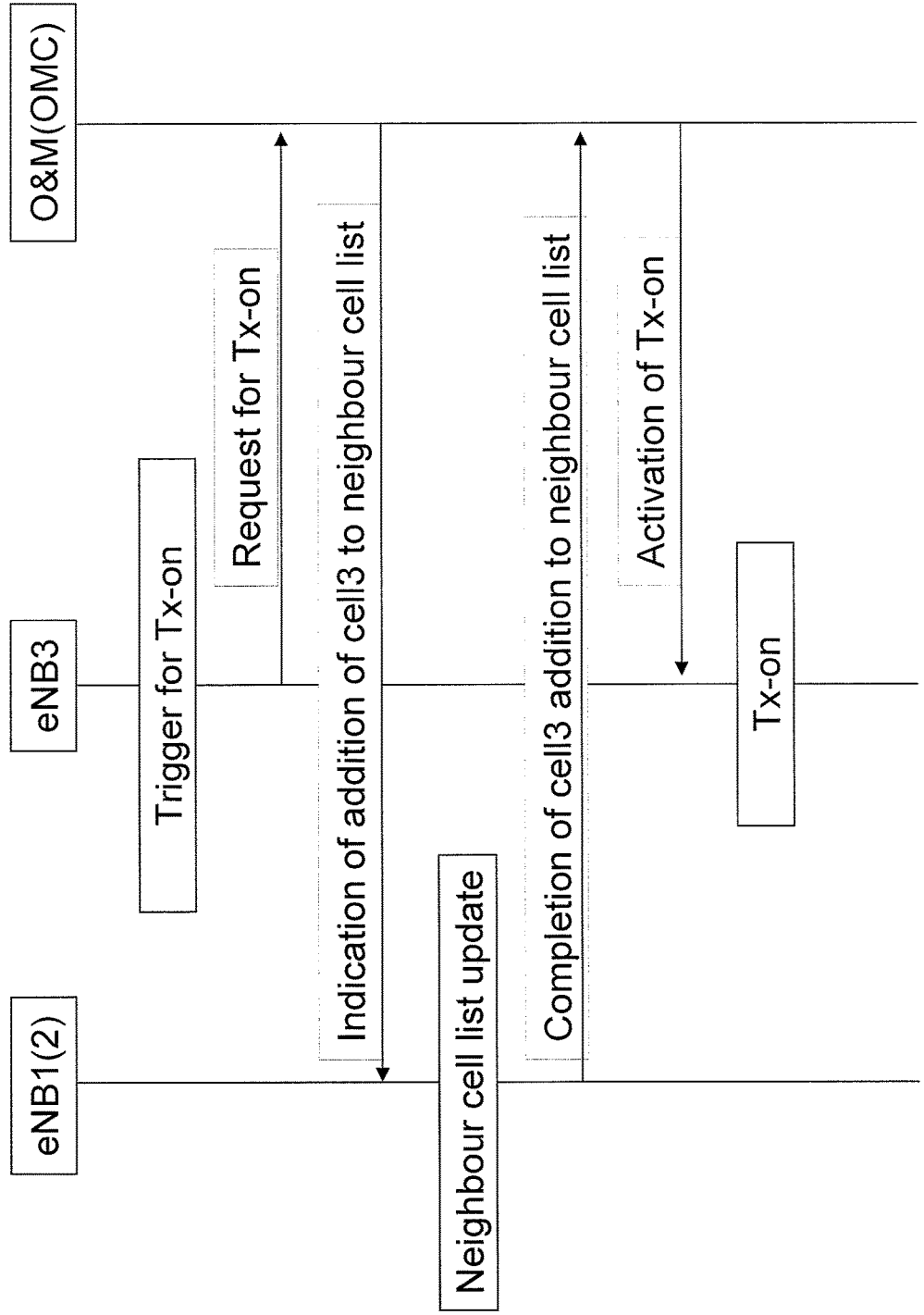

FIG. 9 depicts a neighbor cell list control sequence for the neighbor cell list in case the radio base station eNB3 switches the transmission on. The sequence in case of switching-on of the transmission, shown in FIG. 9, is basically the reverse of the sequence in case of switching-off of the transmission shown in FIG. 5.

The eNB3 detects that a terminal engaged in communication with another radio base station exists within a range that may be serviced by the own station, for example, within the cell 3 of FIG. 1. The eNB3 also detects that received signal strength of transmission signal from the corresponding terminal is high and/or load on the neighboring base station is high such that it is necessary or efficient for the eNB3 itself to switch the transmission on, that is, to make the cell 3 active (see 'Trigger for Tx-on' of FIG. 9).

A radio base station in a Tx-off state (Sleep state) may be triggered to be switched to a Tx-on state (Wakeup) further,
 when a preset number or more of terminals that belong to
  a set of terminals (CSG) which are allowed to be connected to the radio base station, are in the area close to the radio base station, or connected to one of neighboring base stations; or by when a preset time is reached.

The eNB3 requests the O&M (OMC) to switch the transmission of its own cell (cell 3) on (see 'Request for Tx-on' in FIG. 9). This request corresponds to the state control information.

The O&M (OMC) indicates to the neighbor radio base stations eNB1 and eNB2 to add the cell 3 into the neighbor cell list, because the eNB3 switches on the transmission in the cell 3, by way of providing the management information (see 'Indication of addition of the cell 3 to neighbor cell list' of FIG. 9).

The eNB1 and eNB2 add the cell 3 to their own neighbor cell lists (see 'Neighbor cell list update' of FIG. 9) and notify the O&M (OMC) of the completion of update of the neighbor cell list (see 'Completion of cell 3 addition to the neighbor cell list' of FIG. 9).

The O&M (OMC) notifies to the eNB3 that switching transmission on in the cell 3 is allowed (see 'Activation of Tx-on' of FIG. 9). The eNB3 switches transmission in its cell (cell 3) on (see 'Tx-on' of FIG. 9).

After the update the neighbor cell lists, the eNB1 and eNB2 then broadcast or uni-cast to the terminals in their cells the information needed by the terminals in the cells for updating their neighbor cell lists. Examples of the information sent to the terminals include update information of radio parameters.

By following the above operational sequence, it is possible to prevent increase of interference due to the neighboring base stations eNB1 and eNB2 leaving the setting of radio parameters intact without being informed of switch-on of transmission in the cell 3 by the neighboring base station eNB3. It is also possible to prevent reporting in case a terminal in the cell of the neighboring base station eNB1 or eNB2 has detected the eNB3 (reporting on detection of a neighbor cell).

It is noted that, in FIG. 9, the O&M (OMC) indicates the neighboring base stations eNB1 and eNB2 of the update of the neighbor cell lists (addition of the cell 3). In the present exemplary embodiment, the O&M (OMC) may indicate not only the update of the neighbor cell lists but also the update of the other radio parameters simultaneously, as shown in FIG. 10 (see 'Indication of addition of cell 3 to neighbor cell list and updated other radio parameter information' of FIG. 10).

Figure 10:
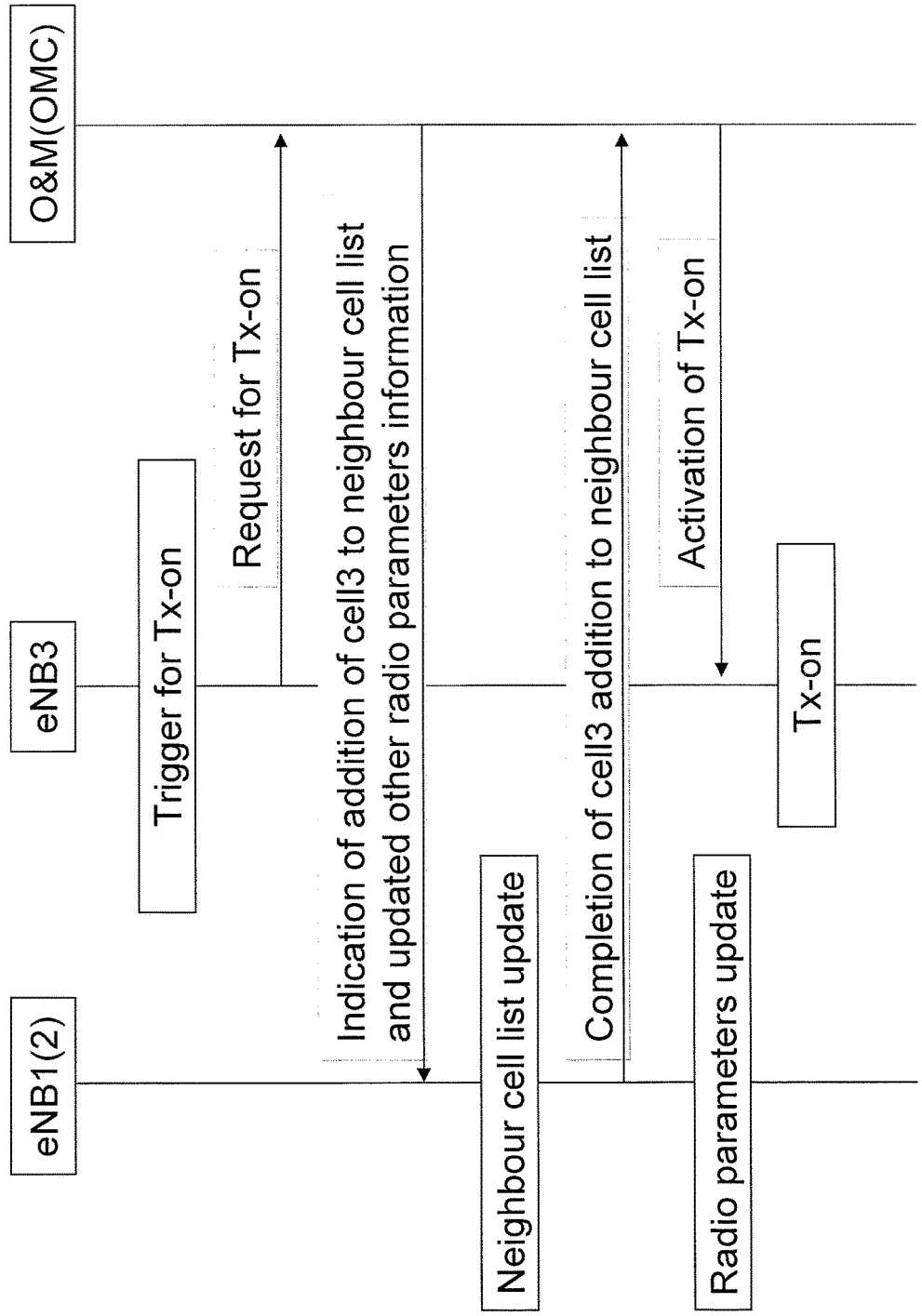

At this time, the eNB1 and eNB2 notify the O&M (OMC) of the update of the neighbor cell lists (see 'Completion of cell 3 addition to neighbor cell list' of FIG. 10). The eNB1 and eNB2 then update the radio parameters (see 'Radio parameters update' of FIG. 10).

The eNB1 and eNB2 notify the terminals in the cells of the own stations of the update of the radio parameters as necessary. It is noted that the eNB1 and eNB2 may update radio parameters other than the neighbor cell lists after the update of the neighbor cell lists, as shown in FIG. 10. Or, the eNB1 and eNB2 may update the radio parameters simultaneously or before the update of the neighbor cell lists. Further, the O&M (OMC) may indicate to the eNB1 and eNB2 that the radio parameters are to be updated simultaneously, immediately before or immediately after sending Tx-on allowance to the eNB3. The eNB1 and eNB2 then update the radio parameters accordingly.

FIGS. 11 and 12 illustrate update of the neighbor cell list. FIGS. 11A and 11C show examples of neighbor cell lists owned by the eNB1 and eNB2, respectively. As in FIGS. 7A-7D, each cell list includes index (Indices) and an identifier of target cells (TCI) associated with the indices.

If, in the states of the neighbor cell lists of FIGS. 11A and 11C, the O&M (OMC) has indicated to the eNB1 and eNB2 that the eNB3 will switch the transmission in the cell 3 on, the eNB1 and eNB2 add TCI#3 to the neighbor cell list, as shown in FIGS. 11B and 11D.

Like FIGS. 8A-8D, FIGS. 12A-12D shows a case where each of the eNB1 and eNB2 owns a white neighbor cell list (White Neighbor Cell List) to which a terminal is allowed to access and a black neighbor cell list (Black Neighbor Cell List) to which the terminal is not allowed to access.

It is now presupposed that, in the states of the white neighbor cell list and the black neighbor cell list of FIGS. 12A, 12C, the O&M (OMC) has indicated to the eNB1 and eNB2 that the eNB3 will switch transmission in the cell 3 on. In such case, the eNB1 and eNB2 add TCI#3 to the white neighbor cell list, while removing TCI#3 from the black neighbor cell list, as shown in FIGS. 12B and 12D As already discussed above, the locations of addition to the neighbor cell list may be different from those shown in connection with the method of FIGS. 11 and 12.

Figure 13:
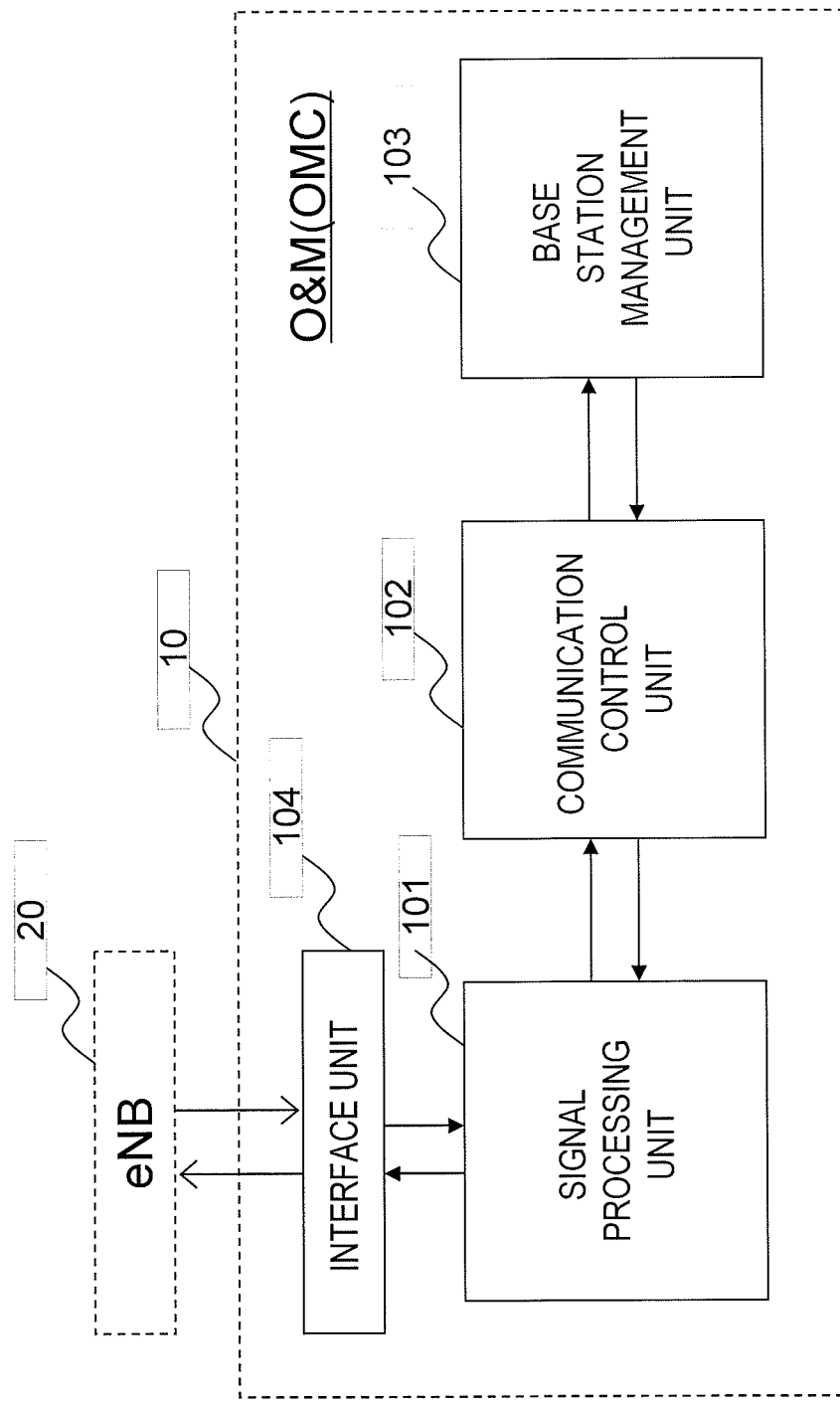
FIG. 13 is a block diagram showing the configuration of an O&M in the first exemplary embodiment of the present invention.
Figure 14:
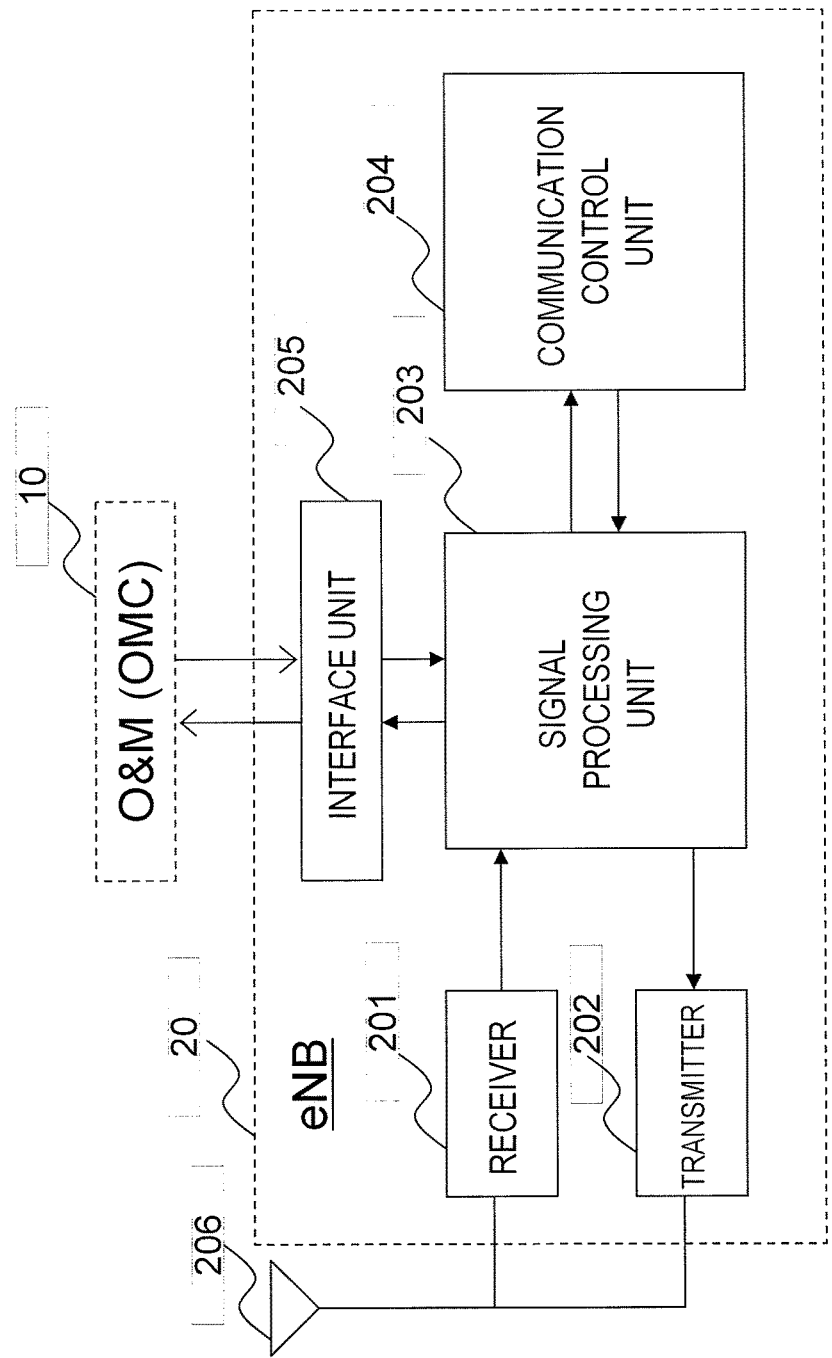
FIG. 14 is a block diagram showing the configuration of a radio base station eNB in the first exemplary embodiment of the present invention.

FIG. 13 depicts a block diagram showing the configuration of an O&M (OMC) in first exemplary embodiment of the present invention. FIG. 14 depicts a block diagram showing the configuration of a radio base station eNB in the first exemplary embodiment of the present invention.

In FIG. 13, an O&M (OMC) 10 includes a signal processor 101, a communication controller 102, a base station management unit 103 that manages base stations under its control, and an interface unit 104 for interfacing with a radio base station eNB20.

In FIG. 14, the radio base station eNB20 includes a receiver 201 and a transmitter 202, connected to an antenna 206, a signal processor 203, a communication control unit 204 and an interface unit 205 for interfacing with the O&M (OMC) 10. It is noted however that the method of the radio base station eNB3 switching the transmission off or on, shown in the first exemplary embodiment, described above, is merely illustrative, such that it is also possible to use a method that uses other references or triggers.

Figure 25:
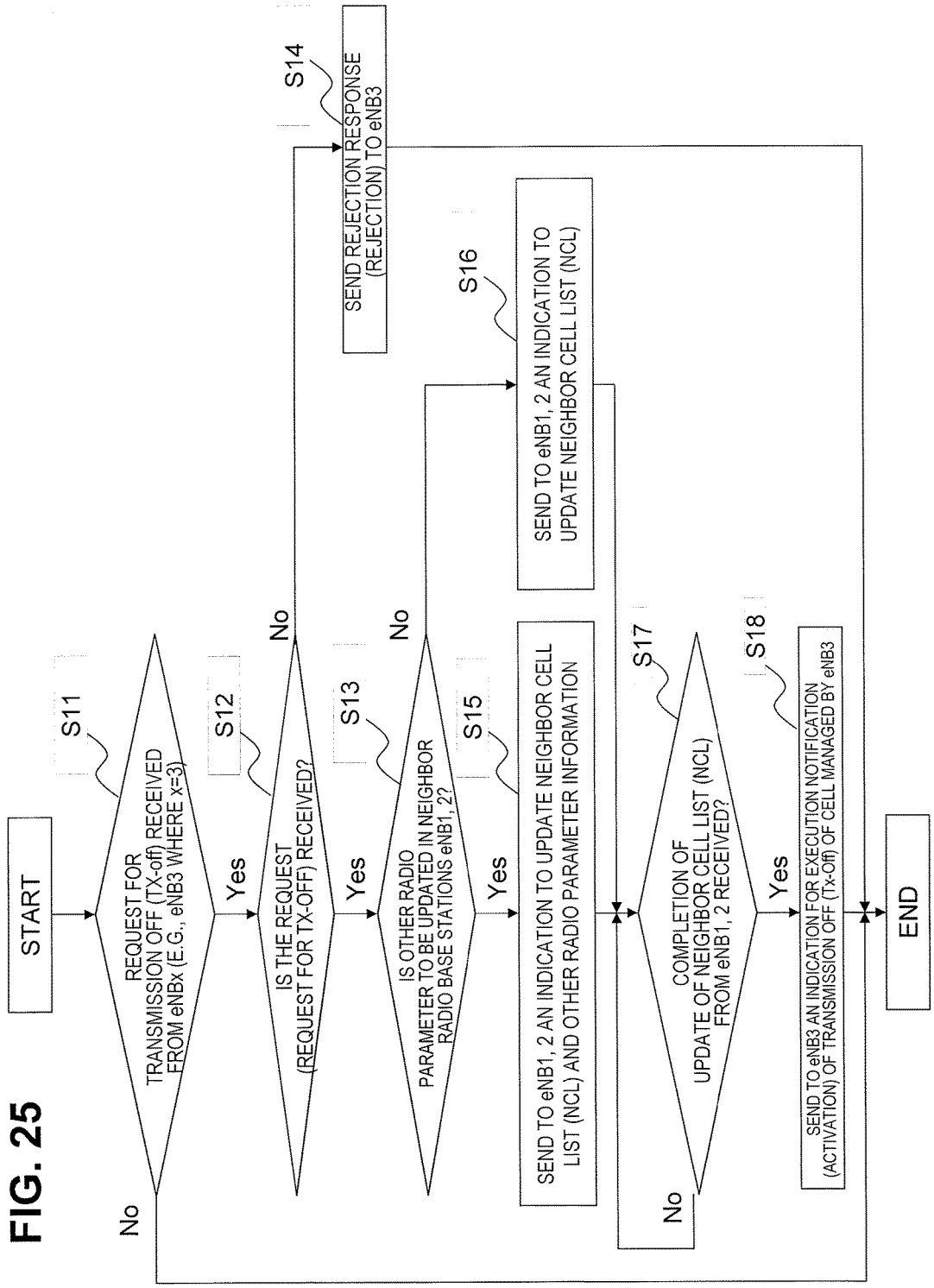
FIG. 25 is a flowchart showing an example processing sequence of an O&M in the first and second exemplary embodiments of the present invention.

FIG. 25 is a flowchart that has generalized the processing by the O&M (OMC) in the sequences of FIGS. 5 and 6. The processing sequence by the O&M (OMC) will now be explained with reference to FIGS. 13, 5 and 25.

On receiving a transmission off (Tx-off) request from the eNBx, for example, eNB3 where x of eNBx is 3, via the interface unit 104 and the signal processor 101 (step S11), the communication controller 102 of the O&M (OMC) 10 notifies the request for transmission off (Tx-off) to the base station management unit 103.

The base station management unit 103 of the O&M (OMC) 10 checks if it will accept the request (request for Tx-off) (step S12).

In case the base station management unit 103 of the O&M (OMC) 10 does not accept the request for Tx-off from the eNB3 (No branching of step S12), the base station management unit sends a response for rejection via the communication controller 102, signal processor 101 and the interface unit 104 to the eNB3 (step S14).

In case the base station management unit 103 of the O&M (OMC) 10 accepts the request for Tx-off from the eNB3 (Yes branching of step S12), the base station management unit determines whether or not, with Tx-off of the eNB3, update of other radio parameters is needed in the neighboring base stations eNB1 and eNB2 neighboring to the cell of the eNB3 (step S13).

In case the base station management unit 103 of the O&M (OMC) decides that other radio parameters need to be updated in the eNB1 and eNB2, the base station management unit 103 transmits an indication that the neighbor cell list (NCL) is to be updated and the information on other radio parameters via the communication controller 102, signal processor 101 and the interface unit 104 to the eNB1 and eNB2 (step S15). It is noted that the indication to update the neighbor cell list (NCL) may include just the indication or may further include the contents of update.

In case it is determined at the base station management unit 103 of the O&M (OMC) that the update of the other radio parameters is unneeded in the eNB1 and eNB2, an indication to update the neighbor cell list (NCL) is sent via the communication controller 102, signal processor 101 and the interface unit 104 to the eNB1 and eNB2 (step S16).

On receiving a completion of the update the neighbor cell list (NCL) from the eNB1 and eNB2 via the interface unit 104, a signal processor 101 and the communication with controller 102 (Yes branching at step S17), the base station management unit 103 of the O&M (OMC) sends to the eNB3 an instruction to notify the execution of transmission off (Tx-off) of a cell managed by the eNB3 via the communication controller 102, signal processor 101 and the interface unit 104 (activation).

Figure 26:
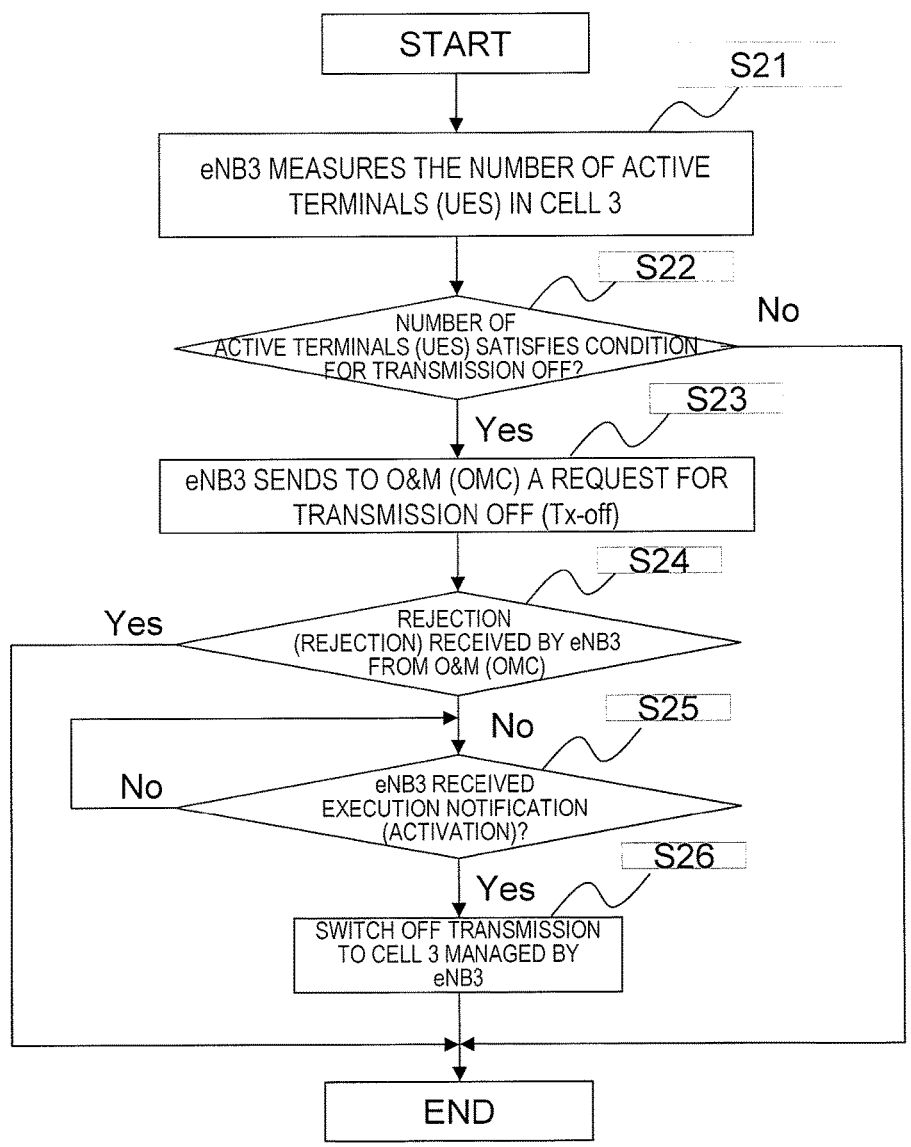
FIG. 26 is a flowchart showing an example processing sequence of an eNB3 in the first and second exemplary embodiments of the present invention.

FIG. 26 depicts a flowchart showing a sequence for processing the eNB3. Following describes the processing sequence of the eNB3 with reference to FIG. 14, FIG. 5 and FIG. 26. The communication control unit 204 of the eNB3 measures the number of active terminals (UEs) in the cell 3 (step S21).

In case the number of active terminals (UEs) satisfies a condition for transmission off (Yes of step S22), the communication control unit 204 of the eNB3 sends a transmission off (Tx-off) request to the O&M (OMC) 10, via the signal processor 203 and interface unit 205 (step S23).

On receiving not the refusal (rejection) (No of the step S24) but the notification for execution (activation) from the O&M (OMC) 10 (Yes of the step S25), the communication control unit 204 of the eNB3 controls the transmitter 202 to switch off the transmission to the cell 3 managed by the eNB3 (step S26). It is noted that the number of active terminals may be measured at a preset time interval. The number of active terminals may also be an average value over a preset time length or of other suitable values.

Figure 27:
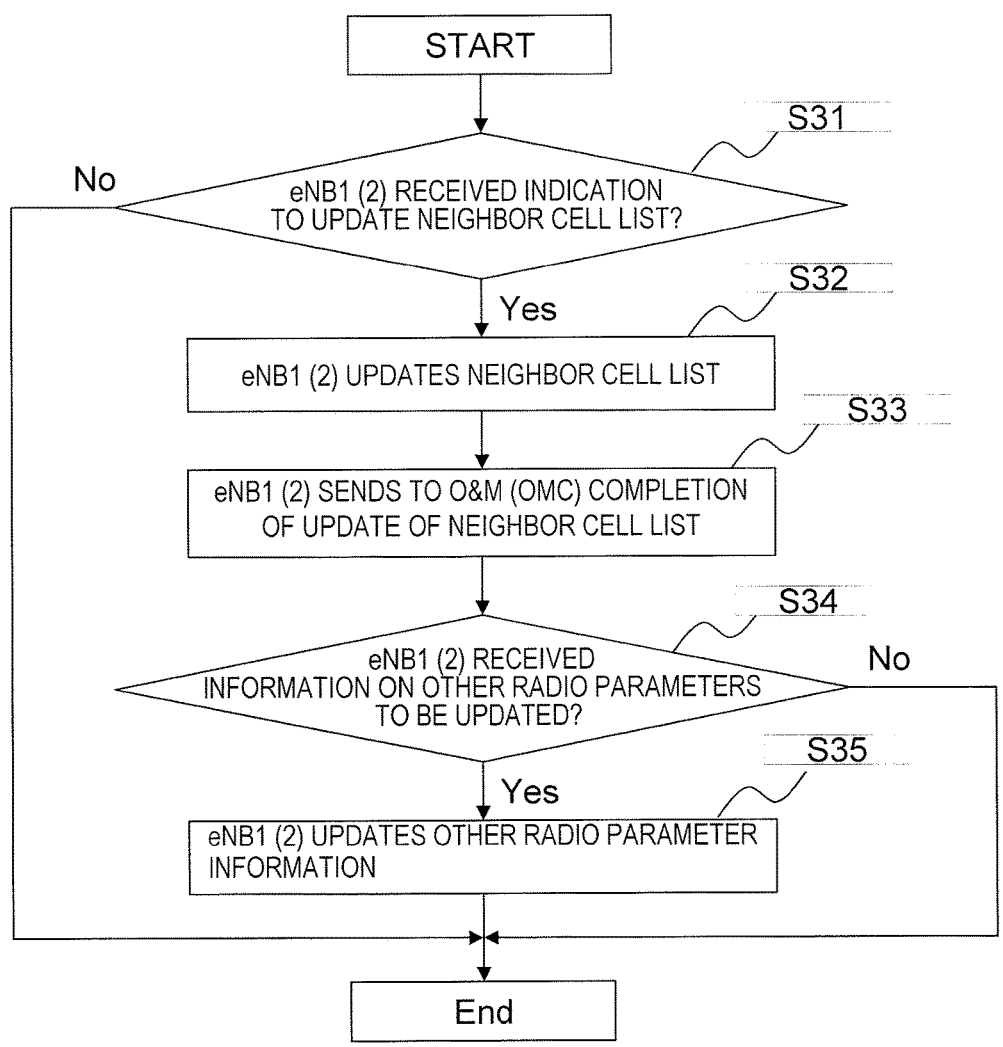
FIG. 27 is a flowchart showing an example processing sequence of an eNB1 (2) in the first and second exemplary embodiments of the present invention.

FIG. 27 is a flowchart showing a processing sequence for the eNB1 (2). Following describes the processing sequence for the eNB1 (2) with reference to FIG. 14, FIG. 5 and FIG. 27.

On receiving an indication to update the neighbor cell list (NCL) from the O&M (OMC) 10 via the interface unit 205 and the signal processor 203 (Yes of step S21), the communication control unit 204 of the eNB1 (2) updates the stored inner neighbor cell list (NCL) not shown (step S32). The eNB1 (2) transmits the completion of update of the neighbor cell list via the signal processor 203 and the interface unit 205 to the O&M (OMC) 10 (step S33).

On receiving from the O&M (OMC) 10 the radio parameter information to be updated (Yes of step S34) via the interface unit 205 and the signal processor 203, the communication control unit 204 of the eNB1 (2) updates the other radio parameter information of the eNB1 (2) (step S33).

Modification of Exemplary Embodiment 1

Figure 15:
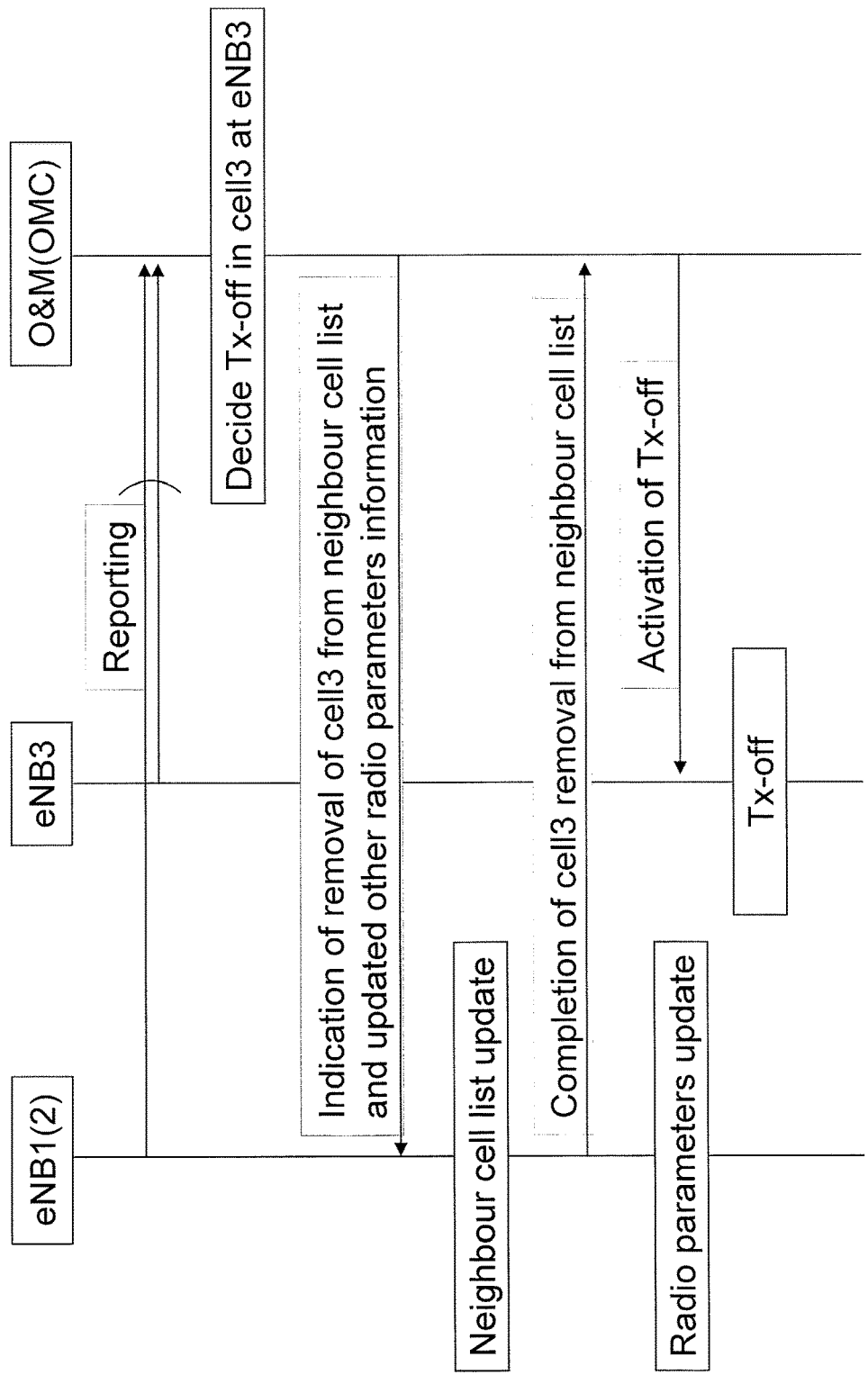
FIG. 15 is a diagram showing a control sequence in case of transmission off of a radio base station according to a modification of the first exemplary embodiment of the present invention.
Figure 16:
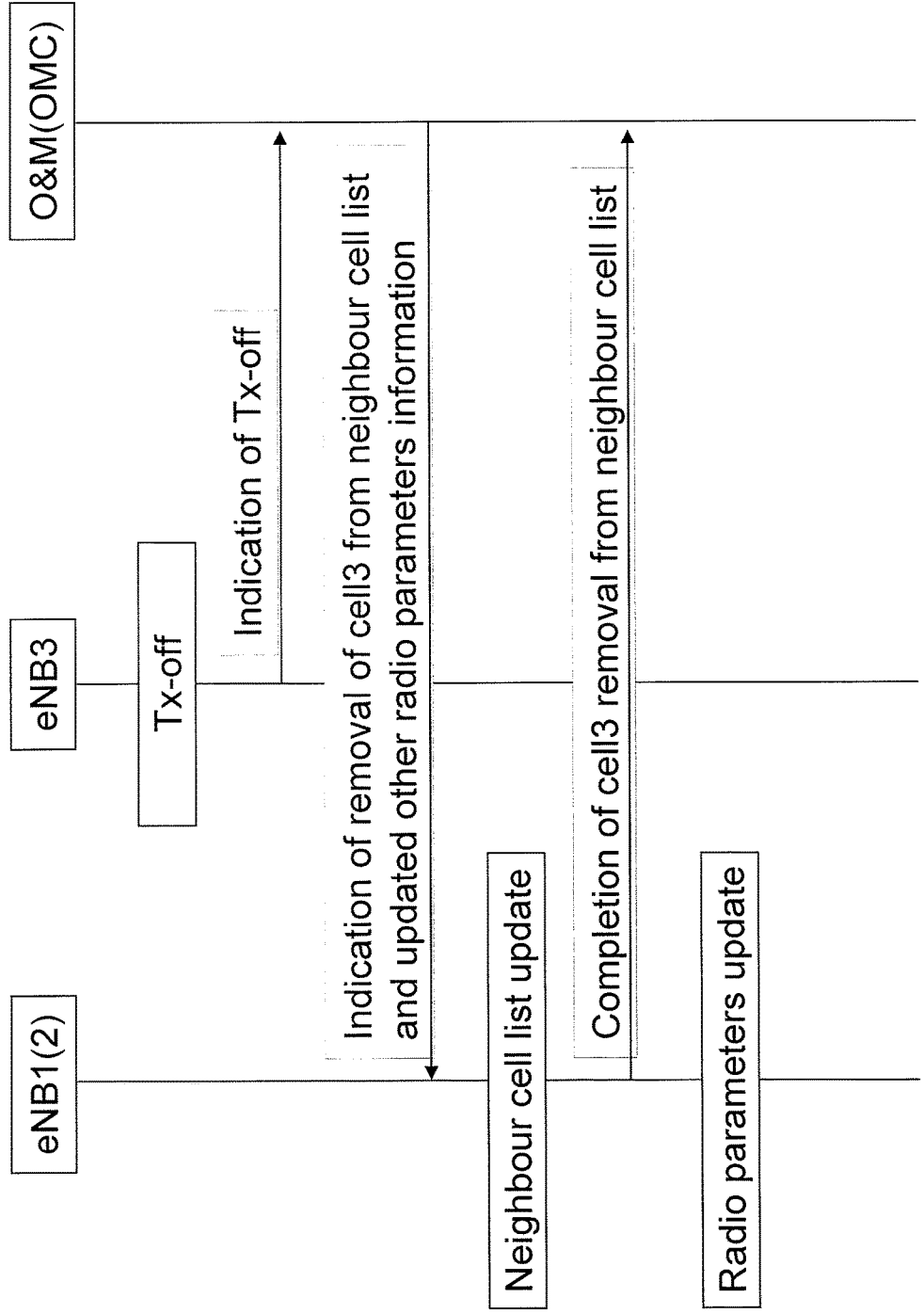
FIG. 16 is a diagram showing another control sequence in case of transmission off of the radio base station according to a modification of the first exemplary embodiment of the present invention.

FIGS. 15 and 16 illustrate a modification of the first exemplary embodiment of the present invention. FIG. 15 shows the control sequence in case the O&M (OMC) controls the transmission on/off of the radio base station eNB3.

Initially, the radio base stations eNB1, eNB2 and eNB3 report to the O&M (OMC) the traffic information such as the number of terminals within the own cells that are engaged in communication or in the active states (see 'Reporting' of FIG. 15). In the present exemplary embodiment, this report (Reporting) corresponds to the state control information.

The O&M (OMC) decides switching off the transmission in the cell 3 of the eNB3 in accordance with the information reported from the radio base station (see 'Decide Tx-off in cell 3 at eNB3' of FIG. 15). The O&M (OMC) indicates to the eNB1 and eNB2 the removal of the cell 3 from the neighbor cell list as the management information, while also indicating to the eNB1 and eNB2 the update of the other radio parameters (see 'Indication of removal of cell 3 from neighbor cell list and updated other radio parameter information' of FIG. 15).

After updating the neighbor cell list (see 'neighbor cell list update' of FIG. 15), the eNB1 and eNB2 report to the O&M (OMC) the completion of update of the neighbor cell list (see 'Completion of cell 3 removal from neighbor cell list' of FIG. 15). The eNB1 and eNB2 also update other radio parameters (see 'Radio Parameter Update' of FIG. 15).

The O&M (OMC) indicates to the eNB3 that transmission in its cell (cell 3) is to be switched off (see 'Activation of Tx-off' of FIG. 15).

After receiving the indication, the eNB3 switches off the transmission in the cell 3 (see 'Tx-off' of FIG. 15).

In the present modification of first exemplary embodiment, it is possible, by following the above procedure, to control the radio parameters, such as neighbor cell list, more appropriately even in case there is a radio base station that switches off the transmission in its cell.

FIG. 16 shows a control sequence in case the eNB3 autonomously switches off the transmission in its cell (cell 3).

The eNB3 switches off the transmission in its cell (cell 3) by some trigger (see 'Tx-off' of FIG. 16), after which the eNB3 reports to the O&M (OMC) that the transmission has been switched off (see 'Indication of Tx-off' of FIG. 16). It is noted that the transmission off processing includes not only the instantaneous transmission off processing but also stepwise transmission off processing. In the latter case, the reported transmission on/off time is a time point of initiation of the initial stage of the stepwise processing or an intermediate stage in the course of transmission off processing.

The O&M (OMC) indicates to the eNB1 and eNB2 that the cell 3 is to be removed from the neighbor cell list and that other radio parameters will be updated (see 'Indication of removal of cell 3 from neighbor cell list and updated other radio parameter information' of FIG. 16).

The eNB1 and eNB2 update the neighbor cell list ('neighbor cell list update' of FIG. 16) and notifies the O&M (OMC) of the completion of update of the neighbor cell list (see 'Completion of cell 3 removal from the neighbor cell list' of FIG. 16). The eNB1 and eNB2 also update the other radio parameters (see 'Radio parameters update' of FIG. 16).

In the present modification of first exemplary embodiment, the radio parameters, such as neighbor cell list, may be controlled more appropriately even in case there is a radio base station that autonomously switches off the transmission in its cell, provided that above mentioned procedure is used.

It is noted that, in case the eNB3 switches off transmission at its cell (cell 3), the eNB3 may switch off transmission immediately, or may decrease the transmission power only step-by-step. In the latter case, the notification may be made to the O&M (OMC) at a time point the transmission power has started to be lowered. It is noted that the O&M (OMC) may notify the eNB1 and eNB2 of the state control information indicating that the eNB3 has been triggered in some way to switch off the transmission in its cell (cell 3). In this case, the eNB1 and eNB2 has to determine whether or not the cell 3 is to be removed from the neighbor cell list.

The foregoing description has been made of the case of switching off the transmission in the cell of the own station. However, the same method may be used in case of switching the transmission on a cell of the own station.

In the above described modification of first exemplary embodiment, simply the cell 3 may be removed from or added to the neighbor cell list by way of updating the neighbor cell list, or both the white neighbor cell list and the black neighbor cell list may be used.

Exemplary Embodiment 2

The following describes a second exemplary embodiment of the present invention. In the second exemplary embodiment of the present invention, the cases where the radio base station eNB3 of FIG. 1 switches transmission off (Tx-off) and on (Tx-on), in a cell managed by the radio base station eNB3 itself, as in the above described first exemplary embodiment, will be considered.

FIGS. 17 to 20E illustrate exemplary embodiment 2 of the present invention. In the second exemplary embodiment, in case the radio base station eNB3 switches the transmission off or on in the cell it manages (cell 3 of FIG. 1), the O&M (OMC) indicates, using the management information, that an attribute(s) for the cell 3 in the neighbor cell lists maintained by the eNB1 and eNB2 is to be changed.

Figure 17:
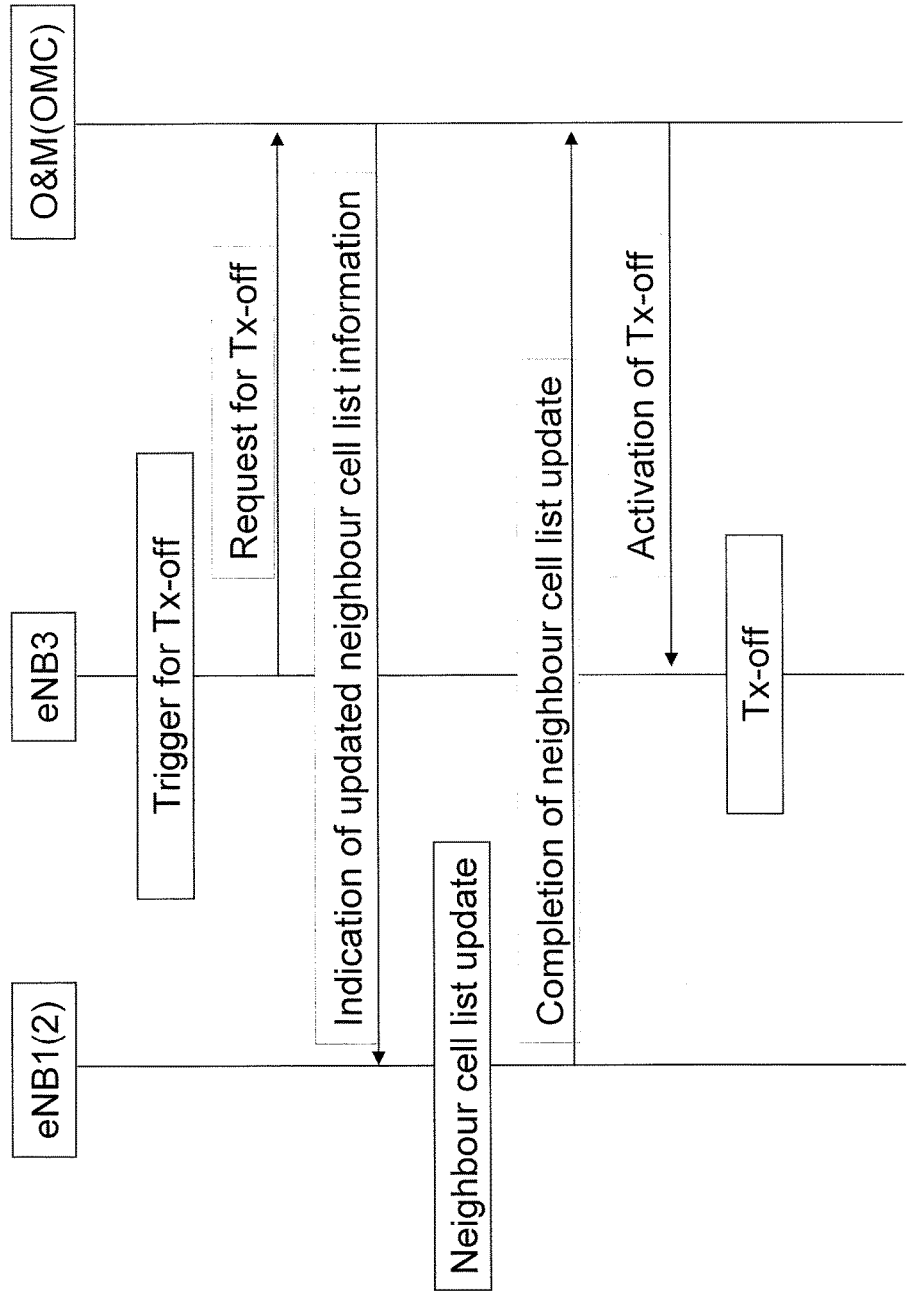
FIG. 17 is a diagram showing a control sequence in case of transmission off of a radio base station according to a second exemplary embodiment of the present invention.

FIG. 17 shows a control sequence for the neighbor cell list in case the radio base station eNB3 is to switch off the transmission.

The eNB3 detects that, since there is no terminal engaged in communication or in an active state in its own cell (cell 3), and/or a neighboring base station is able to cover the area for the own cell (cell 3) even in case transmission in the own cell (cell 3) is switched off, the transmission in the cell 3 may be switched off (see 'Trigger for Tx-off' of FIG. 17).

The eNB3 thus requests the O&M (OMC) to switch off the transmission in the own cell (cell 3) (see 'Request for Tx-off' of FIG. 17). It is noted that this request to switch off the transmission corresponds to the state control information.

The O&M (OMC) indicates to the radio base stations eNB1 and eNB2 that the attribute(s) for the corresponding cell (cell 3) in the neighbor cell lists maintained by the eNB1 and eNB2 are to be changed (see 'Indication of updated neighbor cell list information' of FIG. 17).

The eNB1 and eNB2 update the neighbor cell lists (see 'Neighbor cell list update' of FIG. 17) and report to the O&M (OMC) the completion of update of the neighbor cell lists (see 'Completion of neighbor cell list update' of FIG. 17).

The O&M (OMC) notifies to the eNB3 that the transmission in the own cell (cell 3) is to be switched off (see 'Activation of Tx-off' of FIG. 17).

The eNB3 switches off the transmission in the own cell (cell 3) in accordance with the notification (see 'Tx-off' of FIG. 17).

In the present exemplary embodiment, in which the transmission in a given radio base station is switched off with the use of the above mentioned procedure, the neighbor cell list in the neighboring base stations may be managed efficiently and appropriately.

Figure 18:
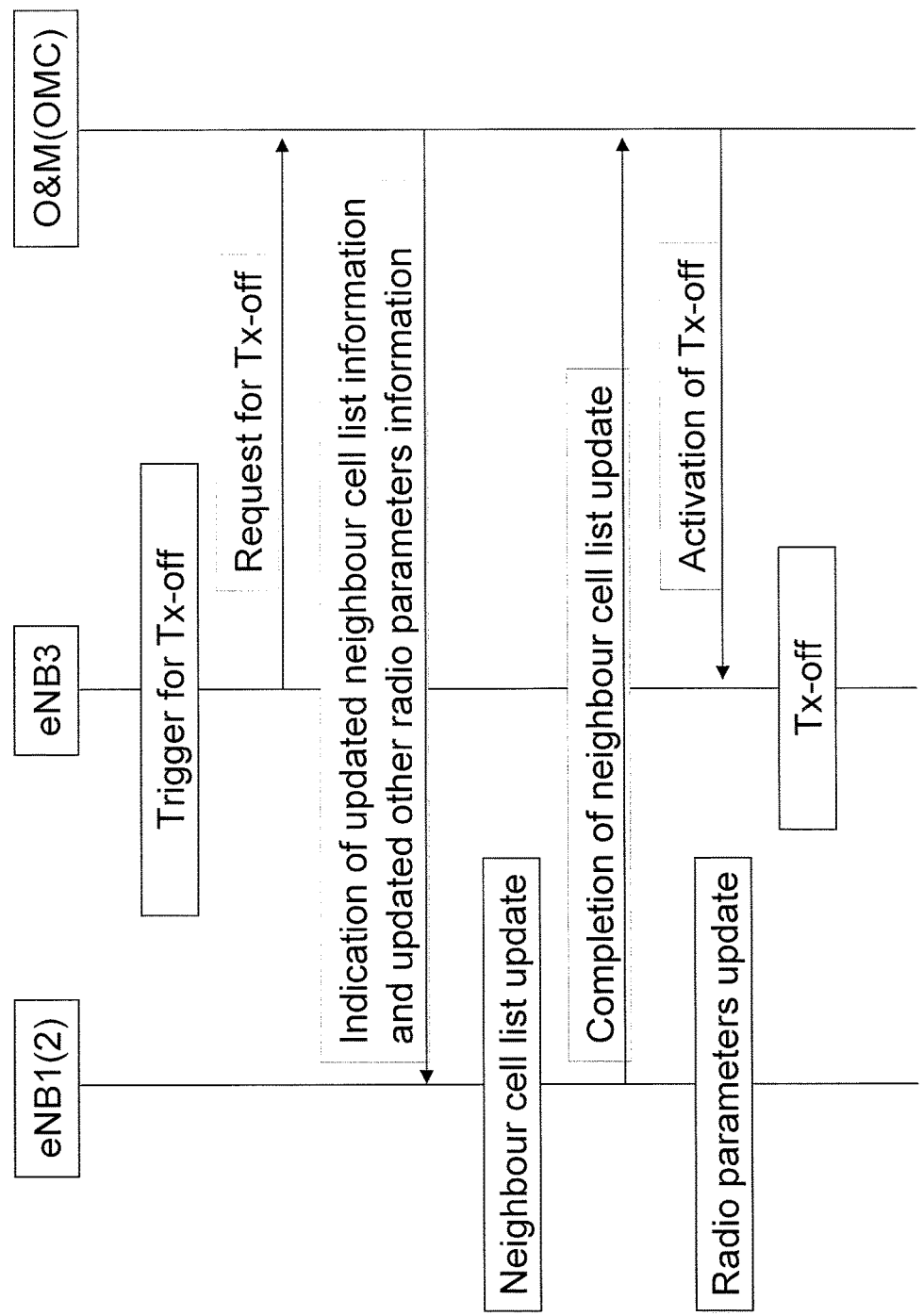
FIG. 18 is a diagram showing another control sequence in case of transmission off of the radio base station according to the second exemplary embodiment of the present invention.

In the present exemplary embodiment, the O&M (OMC) may indicates the update of the neighbor cell list as well as the other radio parameter(s) as shown in FIG. 18 by way of the management information (see 'Indication of updated neighbor cell list information and updated other radio parameter information' of FIG. 18).

In this case, the eNB1 and eNB2
- update the neighbor cell list (see 'Neighbor cell list update' of FIG. 18);
- report neighbor cell list update to the O&M (OMC) (see 'Completion of neighbor cell list update' of FIG. 18); and
- update other radio parameters (see 'Radio parameters update' of FIG. 18).

In the present exemplary embodiment, in which transmission in a given radio base station is switched off with the use of the above mentioned procedure, management of the neighbor cell list and configuration of the other radio parameters may be achieved efficiently and appropriately. It is noted that, in the present exemplary embodiment, update of the radio parameters other than the neighbor cell lists of the eNB1 and eNB2 may be performed after update of the neighbor cell list as in FIG. 18, simultaneously with or before update of the neighbor cell list. In this case, the neighbor cell list is corresponds to a neighbor relation table (NRT). In addition, notification of update of the other radio parameters to the eNB1 and eNB2 may be sent to the eNB1 and eNB2, before, simultaneously with, or after the O&M (OMC) sends the notification of execution of Tx-off to the eNB3.

FIGS. 19A-19E, and FIGS. 20A-20E illustrate the update of the neighbor cell list in the exemplary embodiment 2 of the present invention. FIGS. 19A to 19D show example neighbor cell lists owned by the eNB1 and eNB2. Each neighbor cell list includes an index, identifier of target cell, associated with the index (Target Cell ID or TCI), and attribute for the target cell, such as "No Remove" (removal not possible), "No HO" (handover not possible) or "No X2" (No X2). It is noted that, in FIG. 19E, the attribute "No Remove" in each of CI#2 and TCI#3 is checked.

It is also noted that HO stands for Handover and X2 stands for an interface between base stations in LTE.

The above neighbor cell list is also referred to as a neighbor relation table (NRT).

The NRT, which is a neighbor cell list including an index, an identifier (TCI) of a target cell associated with the index and an attribute(s) for each of the target cells, as one entry, is used as part of an ANR (Automatic Neighbor Relation) Function in LTE, as later explained.

In the neighbor relation table (NRT), if a check (check mark) is set in "No Remove", the radio base station never removes the cell from the neighbor cell list (remove inhibited).

If a check is set in "No HO", the radio base stations eNB1, eNB2 never use the cell as a target of handover (use inhibited).

If a check is set in "No X2", X2 is not used (must not be used) to perform a certain procedure on a radio base station that manages the cell.

In the exemplary embodiment of FIG. 19A, the eB1 recognizes TCI#2, #3 and #4 as neighbor cells, and the attribute "No Remove" is given to each of these TCIs.

On the other hand, referring to FIG. 19C, the eNB2 recognizes TCI#1, #3 and #8 as neighbor cells, and the attribute "No Remove" is given to each of these TCIs. In addition, the attribute "No HO" is also given to the TCI#8.

In case the O&M (OMC) has notified to the eNB1 and eNB2 that, since the eNB3 switches off the transmission at its cell (cell 3), the attribute for the TCI#3 is changed, the eNB1 and eNB2 accordingly update the neighbor cell list, as shown in FIGS. 19B and 19D.

In the present exemplary embodiment, the eNB1 and eNB2 update the neighbor cell list by setting a check in the attributes "No HO" and "No X2" for the TCI#3, as shown in FIGS. 19B and 19D.

It is noted that the O&M (OMC) may send to the eNB1 and eNB2 the same indication to update the neighbor cell lists, or some other different indication.

The same may apply for a case, not shown, where a change of the attribute for TCI#3 is notified to the eNB1 and eNB2 because the eNB3 switches the transmission in the own cell (cell 3) on.

For example, the "No HO" and "No X2" may be unchecked (check mark is removed) to update the neighbor cell lists.

FIGS. 20A-20E show another example neighbor cell list in the second exemplary embodiment of the present invention. In the examples of FIGS. 20A-20E, "No Tx" is added as new attribute to the neighbor cell lists of FIGS. 19A-19E. In case the attribute "No Tx" in the neighbor cell list is checked, the radio base stations keep on recognizing the corresponding cell as a neighbor cell, however, the radio base station behaves as it regards the cell to be not engaged in transmission, that is, to be not servicing. FIG. 20E indicates that a check is set in the attribute "No Remove" for each of the TCI#2 and #3.

It is assumed that the O&M (OMC) has notified to the eNB1 and eNB2 that, since the eNB3 switches the transmission in its own cell (cell 3) off, the attribute for the TCI#3 is to be changed from the state of FIGS. 20A and 20C. In this case, the eNB1 and eNB2 newly check "No HO", "No X2" and "No Tx", out of the attributes for the TCI#3, as shown in FIGS. 20B and 20D.

In the example shown in FIGS. 20A-20E, a check is set in "No X2", and also in "No HO" and "No X2". It is however also possible to check just "No Tx" without checking "No HO" and "No X2", in which case the same constraint as that when both "No HO" and "No X2" are checked may be thought to be imposed.

The same may apply for a case where the eNB3 is informed that the attribute for the TCI#3 is to be changed because the eNB3 switches the transmission in its cell (cell 3) on. For example, the "No HO", "No X2" and "No Tx" for the TCI#3 may be unchecked to update the neighbor cell list.

The attribute "Tx-off" may be replaced by another attribute indicating that a radio base station is to switch (or has switched) transmission in its own cell off.

For example, such attributes as "Tx-off", "Tx stopped", "Sleep", "Non-active", "Inactive", "No-Service" (Servicing not possible) or "Out-of-service", may be used. The attribute may not be an attribute representing a state after completion, but may also be an attribute representing a transient state, such as "Power Down" (power supply off) or "Power up" (power supply on).

On the other hand, the attributes indicating that a radio base station has switched the transmission in its cell on, such as "Tx-on" (transmission on), "Awake" (awake), "Wake up" (wake up) or "Active" (active), may be provided in the neighbor relation table (NRT). In this case, the neighbor cell list is managed so that a check is set in the attribute when the transmission is on. It is noted that processing by FIG. 25 corresponds to the processing by the O&M (OMC) in the sequence diagram of FIGS. 17 and 18, with the neighbor relation table corresponding to the neighbor cell list of FIG. 25. In similar manner, the processing of FIG. 26 corresponds to the processing by the eNB3, while the processing of FIG. 27 corresponds to the processing by that by the eNB1 (2), respectively.

<Outline Configuration of the Second Radio Communication System>

Figure 21:
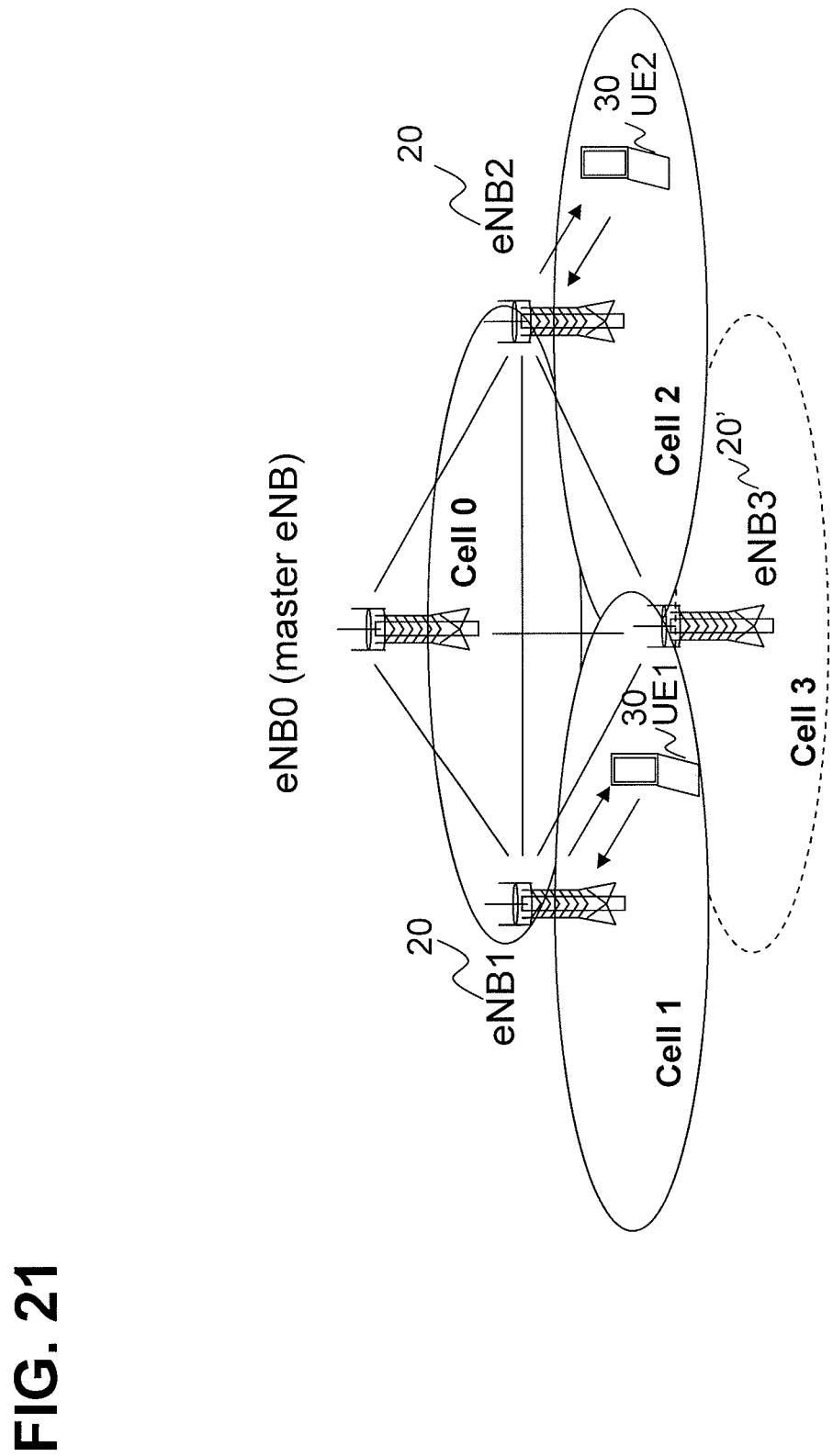
FIG. 21 is a diagram showing a configuration of a radio communication system 2 according to the present invention.

FIG. 21 is a diagram schematically illustrating an example of the configuration of a radio communication system according to another exemplary embodiment of the present invention. This radio communication system 2 includes radio base stations eNB1, eNB2 and eNB3 and a main radio base station (master eNB) eNB0 which is a control station that manages neighboring base stations. It is presupposed that the radio base stations eNB1, eNB2 and eNB3 supervise the cells cell 0, cell 1 and cell 2, respectively. It is noted that the main radio base station (master eNB) is such a device that implements part of the functions of the above mentioned O&M (OMC).

Figure 22:
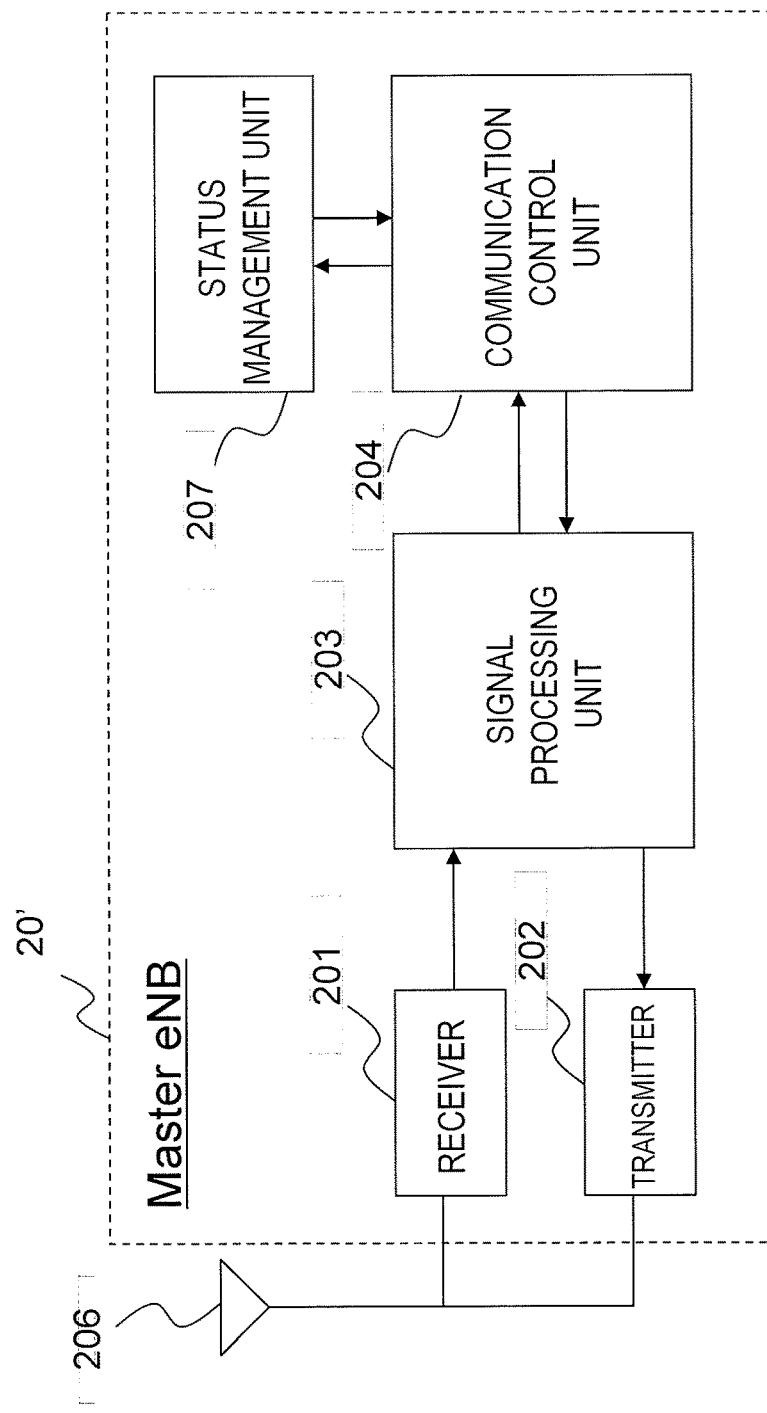
FIG. 22 is a block diagram showing a configuration of a main radio base station in a third exemplary embodiment of the present invention.

The configuration of the main radio base station (master eNB), shown for example in FIG. 22, includes a receiver 201, a transmitter 202, a signal processor 203, a communication control unit 204 and a status management unit 207. It is the status management unit 207 that supervises the neighboring base stations.

Exemplary Embodiment 3

Figure 23:
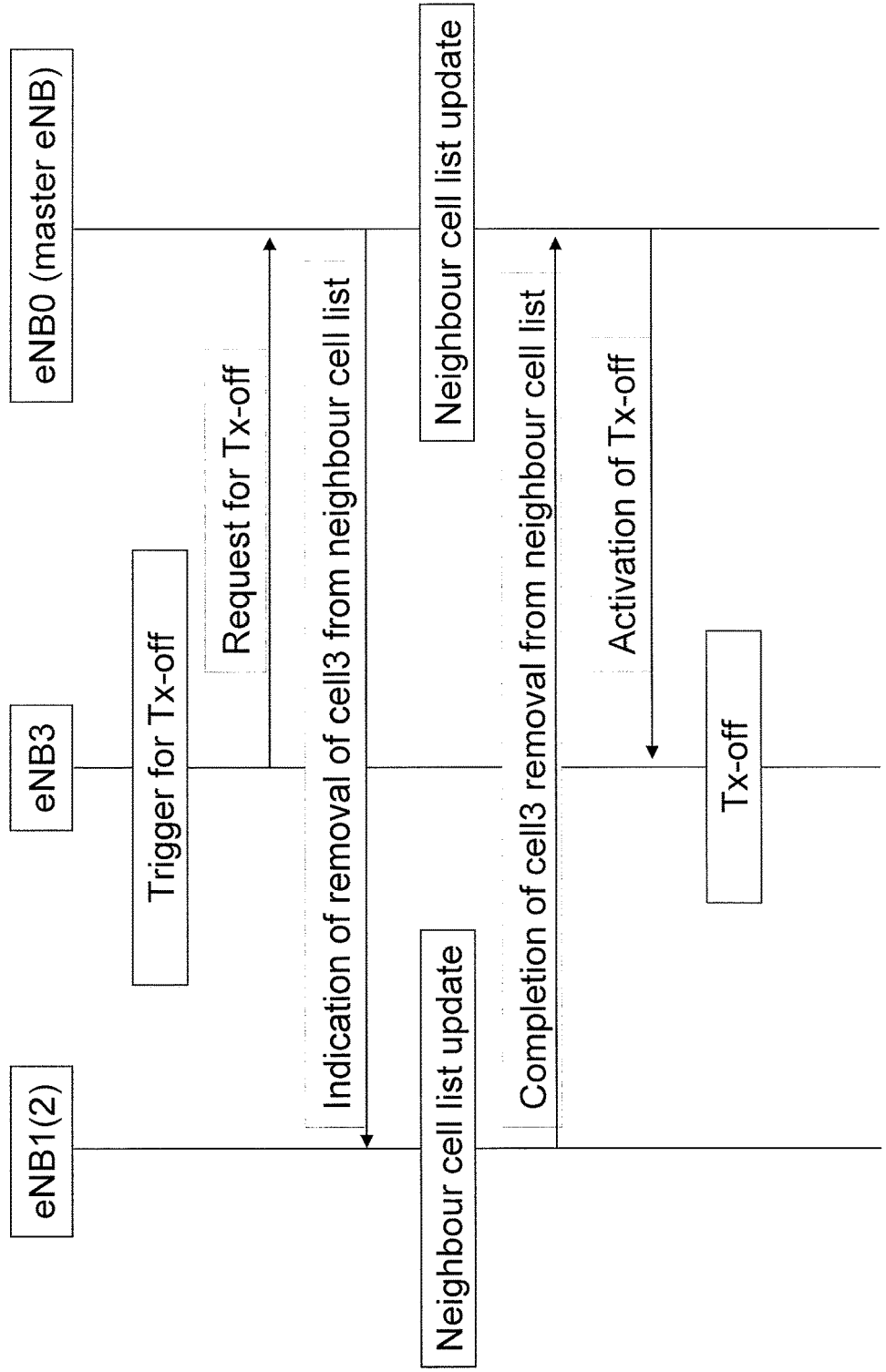
FIG. 23 is a diagram showing a control sequence in case of switching off of the radio base station according to the third exemplary embodiment of the present invention.
Figure 24:
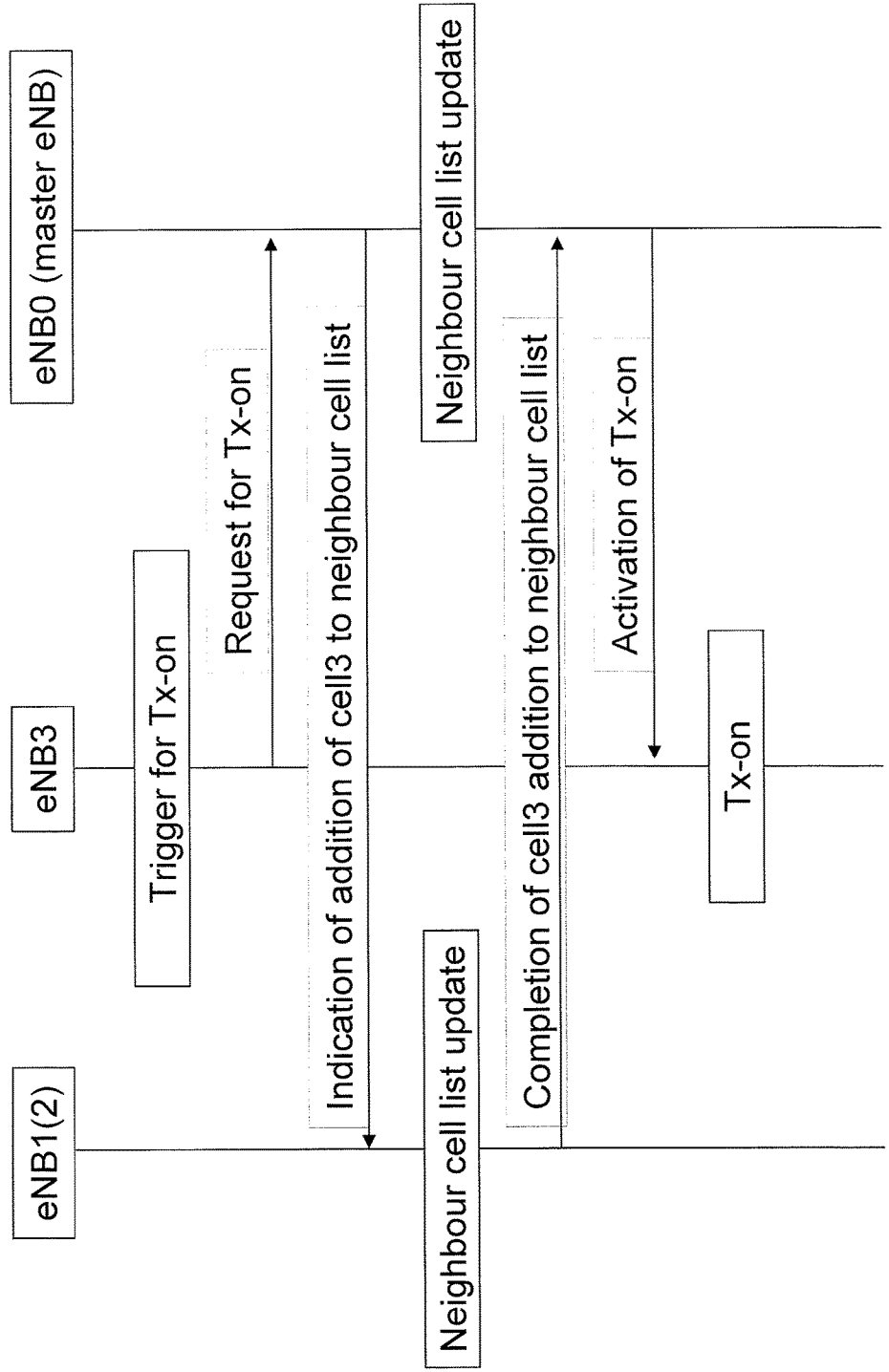
FIG. 24 is a diagram showing a control sequence in case of switching on of a radio base station according to the third exemplary embodiment of the present invention.

FIGS. 23 and 24 are diagrams illustrating a third exemplary embodiment of the present invention. In the present exemplary embodiment, such a case in which the radio base station eNB3 of FIG. 21 switches the transmission in the cell managed by it (cell 3) on (Tx-on) and off (Tx-off) will be considered.

In the present exemplary embodiment, when the transmission in the cell managed by the radio base station eNB3 (cell 3 of FIG. 1) is to be switched off, the main radio base station (master eNB) eNB0 indicates to the neighboring base stations eNB1 and eNB2 that the corresponding cell (cell 3) is to be removed from the neighbor cell list via base station-base station interface x2. At the same time, the corresponding cell (cell 3) is removed from the neighbor cell list maintained by the main radio base station. If the transmission in the cell managed by the radio base station eNB3 (cell 3 of FIG. 1) is to be switched on, the main radio base station (master eNB) eNB0 indicates to the neighboring base stations eNB1 and eNB2 that the corresponding cell (cell 3) is to be added to the neighbor cell list via base station-base station interface x2. At the same time, the corresponding cell (cell 3) is added to the neighbor cell list owned by the main radio base station.

FIG. 23 is a diagram showing the control sequence for the neighbor cell list in case the radio base station eNB3 switches transmission off.

The eNB3 detects that, from the fact that
there is no terminal engaged in communication in the own cell (cell 3), there is no terminal in an active state, and/or
an area of the own cell (cell 3) may be covered by the neighboring base stations even if the transmission in the own cell (cell 3) is switched off,
the situation is such as allows transmission off (see 'Trigger for Tx-off' of FIG. 23). The eNB3 thus requests the main radio base station eNB0 to switch transmission in the own cell (cell 3) off (see 'transmission on/off request' of FIG. 23).

The eNB0 indicates to the neighboring base stations eNB1 and eNB2 that the cell 3 is to be removed from the neighbor cell list (see 'Indication of removal of cell 3 from neighbor cell list' of FIG. 23). At the same time, the eNB0 removes the cell 3 from its neighbor cell list (see 'neighbor cell list update' of FIG. 23).

The eNB1 and eNB2 remove the cell 3 from their neighbor cell lists (see 'neighbor cell list update' of FIG. 23) and reports to the main radio base station eNB0 that the update of the neighbor cell lists has been completed (see 'Completion of cell 3 removal from neighbor cell list' of FIG. 23).

The eNB0 notifies to the eNB3 that transmission in its cell (cell 3) may be switched off (see 'Activation of Tx-off' of FIG. 23). The eNB3 accordingly switches transmission in the cell 3 off (see 'Tx-off' of FIG. 23).

In case the eNB3 switches transmission in its own cell (cell 3) on, the neighbor cell list may be managed appropriately in the same manner. The operational sequence is shown in FIG. 24.

The eNB3 detects that, since there is a terminal engaged in communication with another radio base station within a range in which the eNB3 itself is able to provide services, such as within the cell 3, and the received signal strength of the transmission signal of the terminal is high such that it is necessary or efficient that the eNB3 itself switches transmission on to make the cell 3 active (see 'Trigger for Tx-on' of FIG. 24).

The eNB3 thus requests the main radio base station eNB0 that the eNB3 switches transmission of the own cell (cell 3) on (see 'Request for Tx-on' of FIG. 24).

The main radio base station eNB0 indicates to the neighboring base stations eNB1 and eNB2 that the cell 3 will be added to the neighbor cell lists (see 'Indication of addition of cell 3 to the neighbor cell list' of FIG. 24). The main radio base station also adds the cell 3 to its own neighbor cell list (see 'neighbor cell list update' of FIG. 24).

The eNB1 and eNB2 add the cell 3 to their neighbor cell lists (see 'neighbor cell list update' of FIG. 24) and report to the main radio base station eNB0 that the update of the neighbor cell list has been completed (see 'Completion of cell 3 addition to neighbor cell list' of FIG. 24).

The main radio base station eNB0 notifies to the eNB3 that the eNB3 may switch transmission in the cell 3 on (see 'Activation of Tx-on' of FIG. 24). The eNB3 accordingly switches transmission in the cell 3 on (see 'Tx-on' of FIG. 24).

With the present exemplary embodiment, the neighbor cell list may be managed efficiently and appropriately even in case there is a radio base station in a neighborhood area whose transmission is turned off or on, provided that the above mentioned operational sequence is used. In the present exemplary embodiment, when the eNB3 switches the transmission in the own cell (cell 3) off, the main radio base station eNB0 may leave the cell 3 intact, that is, in a state not removed from the neighbor cell list owned by the main radio base station eNB0 itself. Or, the main radio base station eNB0 may leave the cell 3 in a state not removed from its neighbor cell list and give some or other information, for example, the information that the cell 3 has switched transmission off only temporarily and prepares for the case of re-switching on of transmission.

In the above described exemplary embodiment, the case of the radio base station switching transmission in the own cell off or on (the case of switching transmission at a specific frequency on or off, and the case of transmission of the radio base station in its entirety on or off), is taken up as an instance of wakeup/sleep. However, of course, the present invention is not limited to these cases. For example, the present invention may be applied to the case of new installation or removal of a radio base station or to a case of relocating a radio base station to other site. The sleep of a radio base station may be defined as cessation (switch-off) of just the transmission of a radio unit, cessation (switch-off) of both transmission and reception, or power off.

The present invention may be applied not only to 3GPP LTE, but also to such radio communication system as
3GPP WCDMA (Wideband Code Division Multiple Access),
GSM (Global System for Mobile communications), or
WiMAX (Worldwide interoperability for Microwave Access). It is noted that, in 3GPP WCDMA, there are cases where the O&M function is provided in the RNC (Radio Network Controller) connected to the radio base station.

The following describes the ANR (Automatic Neighbor Relation Function) in connection with the Non-Patent Document 2 by way of supplementing the description of the present invention (see Non-Patent Document 2). An objective of the ANR is to relieve an operator of the labor of manually managing the NR (Neighbor Relations).

Figure 30:
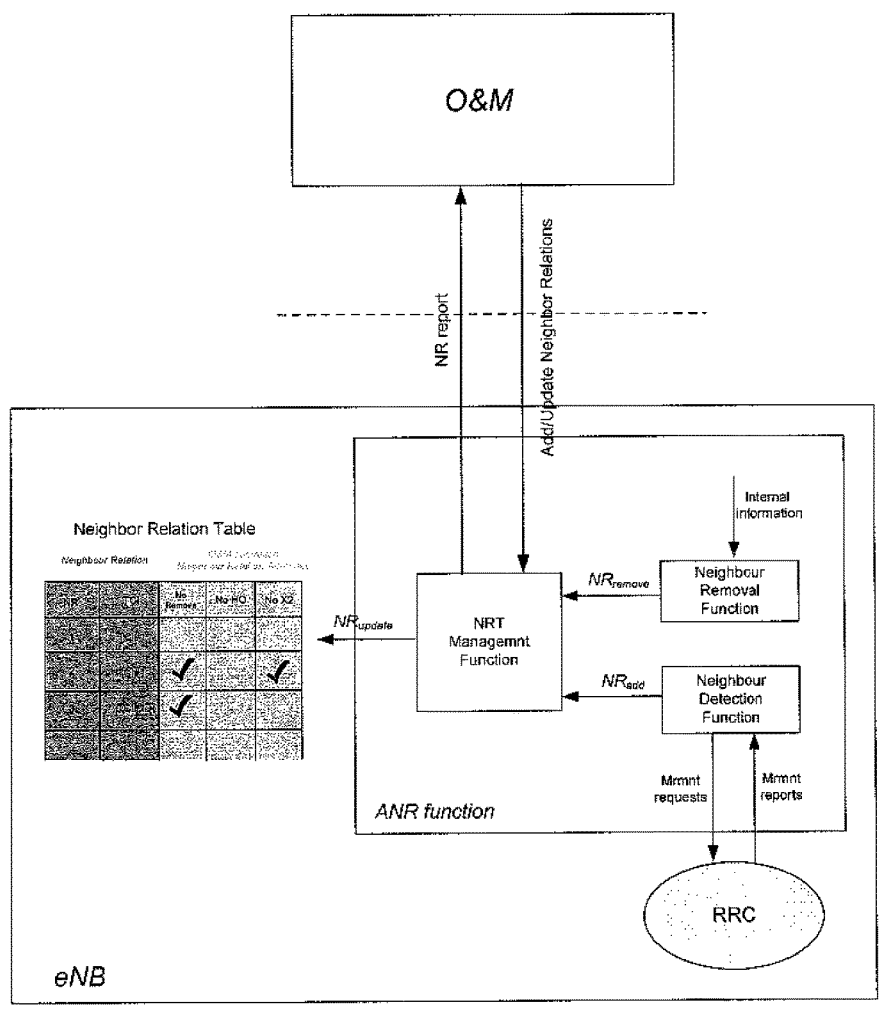
FIG. 30 is a diagram showing ANR and its surrounding (corresponding to FIG. 22 of Non-Patent Document 2).

FIG. 30 shows the ANR and its environment. FIG. 30 is a citation from FIG. 22.3.2a-1 of Non-Patent Document 2 (Interaction between eNB and O&M due to ANR).

The ANR function is implemented in a radio base station eNB to supervise the NRT (Neighbor Relations Table). On detecting a new neighbor cell, a neighbor detection function (Neighbor Detection Function) in the ANR adds the newly detected neighbor cell to the NRT. The neighbor removal function (Neighbor Removal Function) removes outdated NRs, for example, from the NRT.

The neighbor detection function (Neighbor Detection Function) and the neighbor removal function (Neighbor Removal Function) are implementation specific.

A neighbor cell relation (NR) in the context of ANR is defined as follows:

An existing Neighbor Relation from a source cell means that an eNB controlling a source cell:
a) knows ECGI/CGI and PCI of a target cell;
b) has an entry in the NRT (Neighbor Relations Table) for a source cell identifying a target cell; and
c) has an attributes in the NRT defined by O&M or set to a default value.

For each cell that an eNB has, the eNB keeps a NRT (see FIG. 30). For each NR, the NRT contains a Target Cell Identifier (TCI), which identifies a target cell. For UTRAN, the TCI corresponds to the E-UTRAN Cell Global Identifier (ECGI) and Physical Cell Identifier (PCI) of the target cell. Furthermore, each NR has four attributes, namely No Remove, No HO, NoX2 and No Tx.

Of these, when a check is set in No Remove, the eNB does not remove NCL (Neighbor cell Relation) from the NRT.

When a check is set in No HO, the Neighbor Cell Relation is not used by the eNB for handover.

When a check is set in NoX2, the Neighbor Relation does not use X2 in order to initiate a procedure towards the eNB parenting the target cell.

When a check is set in No Tx, the NR (Neighbor Relation) is not used by the eNB for measurement.

The NR (Neighbor cell Relation) is a cell-to-cell relation, while X2 is set between two eNBs. The NR is unidirectional, while X2 is bidirectional.

With ANR, the O&M is able to manage NRT. The O&M is able to add/remove NR and to change NRT's attributes. The O&M is informed of changes in NRT.

The following describe the on/off of a EUTRAN cell, implemented by the present invention.

An eNB is able to switch off transmission in its own cell (Tx-off) if such transmission is unnecessary. An eNB is able to switch transmission in its own cell on (Tx-on) if such transmission is necessary.

A decision on whether or not an eNB performs Tx-on/off, that is, a decision on Tx-on/off, is implementation specific. However, in this case, the O&M is able to manage NRT to avoid undesirable states from occurring. For example, there may be inconveniences such as call disconnection by a UE in a cell where transmission is switched off (Tx-off) by an eNB or increased interference in a cell neighboring to the cell where transmission is switched on (Tx-on) by an eNB.

Tx-on/off by an eNB in its own cell may be made by the following sequence:

1. When triggered to make Tx-on/off, an eNB requests the O&M to allow the eNB to make Tx-on/off.

2. The O&M changes the attributes of neighbor eNBs in the NRT. For example, the No Tx attribute is additionally checked or unchecked by the O&M for a relevant cell. The radio parameter information to be updated in the neighboring eNB may also be transmitted by the O&M.

3. The neighboring eNB updates its own NRT, while updating the radio parameters based on an instruction from the O&M.

4. The O&M sends activation for Tx-on (off) to a relevant eNB to allow the eNB to make Tx-on (off).

In Non-Patent Document 3, '4.2.2.1 Input data, definition of Measurements of Performance Data', input data:

the number of active UEs in a cell is exchanged between the O&M and the NB.

Other measurements, including eNB measurement, are matters for FFS (For Further Study).

Output parameters of the SON (Self Organizing Network) function may include the following information:

information on self-recovery of switching off unneeded cells from the perspective of management, such as system capacity or coverage (self-healing); and information on self-organization of neighbor cell relation concerning switch on/off of a cell (self-optimization).

Measurements with Non-Patent Document 3, '4.2.2.1 Input data, definition of Measurements of Performance Data' are reported to a center SON entity. It is FFS whether or not the SON entity is to be centered upon a center.

The disclosures of the aforementioned Patent Documents and Non-Patent Documents are incorporated by reference herein. The particular exemplary embodiments or examples may be modified or adjusted within the gamut of the entire disclosure of the present invention, inclusive of forms, based on the fundamental technical concept of the invention. Further, a variety of combinations or selection of elements disclosed herein may be made within the framework of the forms. That is, the present invention may cover a wide variety of modifications or corrections that may occur to those skilled in the art in accordance with the entire disclosure of the present invention, inclusive of form and the technical concept of the present invention.

The whole or part of the exemplary embodiments disclosed above can be described as, but not limited to, the following Supplementary notes.

(Supplementary Note 1)

A radio communication system comprising:

a plurality of radio base stations; and a control station connected to said radio base stations; wherein, on occurrence of a trigger for execution of state control of a first one of said radio base stations in said first one of said radio base stations, said first radio base station notifies state control information including information regarding said state control to at least one out of said control station and other radio base stations than said first radio base station before or at a time of start of said state control or in an execution step of said state control.

(Supplementary Note 2)

The radio communication system according to Supplementary note 1, wherein said control station sends one or both of state control information regarding said first radio base station and management information regarding a radio parameter to be updated in accordance with said state control of said first radio base station to at least a second one of said radio base stations that manages a cell neighboring to a cell of said first radio base station.

(Supplementary Note 3)

A radio communication system comprising:

a plurality of radio base stations; and a control station connected to and managing said radio base stations, wherein a first one of said radio base stations notifies state control information including information regarding said state control to at least one out of said control station and other radio base stations than said first radio base station before or at a time of start of said state control or in an execution step of said state control, and said control station notifies at least one of management information regarding a radio parameter to be updated in accordance with said state control and said state control information to at least a second one of said radio base stations that are connected to said control station, said second one of said radio base stations managing at least a cell neighboring to a cell of said first radio base station.

(Supplementary Note 4)

The radio communication system according to any one of Supplementary notes 1 to 3, wherein said control station includes an upper order station managing said radio base stations or a main radio base station performing centralized control on said radio base stations.

(Supplementary Note 5)

The radio communication system according to any one of Supplementary notes 1 to 4, wherein said state control is one out of new installation, removal or relocation of a radio base station;

transmission on/off at a specified frequency managed by said first radio base station; and wakeup/sleep of said first radio base station.

(Supplementary Note 6)

The radio communication system according to Supplementary note 5, wherein said transmission on/off is executed by controlling the transmission power in a stepwise manner.

(Supplementary Note 7)

The radio communication system according to any one of Supplementary notes 1 to 6, wherein said state control information includes at least one out of a result of said state control;
a advanced notice of said state control;
a request for said state control;
details of said state control; and
information that is a reference of decision as to whether or not said state control is to be exercised.

(Supplementary Note 8)

The radio communication system according to Supplementary note 2 or 3, wherein said management information includes at least one out of
a configuration value of a radio parameter;
a difference between a configuration value of a radio parameter and a value of the radio parameter before update; and
control information regarding a radio parameter.

(Supplementary Note 9)

The radio communication system according to Supplementary note 8, wherein said radio parameter includes at least one out of
a neighbor cell list;
transmission power;
an antenna tilt angle;
a handover parameter; and
a cell reselection parameter.

(Supplementary Note 10)

The radio communication system according to Supplementary note 9, wherein said second radio base station controls a value of said transmission power and/or said antenna tilt angle stepwise.

(Supplementary Note 11)

The radio communication system according to Supplementary note 9, wherein said control information regarding said neighbor cell list is one out of
addition to a neighbor cell list of a cell of a radio base station performing said state control;
removal from a neighbor cell list; and
change of an attribute for a cell managed by a radio base station performing said state control.

(Supplementary Note 12)

The radio communication system according to Supplementary note 11, wherein said attribute in said neighbor cell list includes at least one out of
there being access restriction present (Black list);
there being no access restriction present (White list):
removal from said neighbor cell list not being possible (No Remove);
handover not being possible (No Handover);
there being no connection between radio base stations;
there being no information exchange between radio base stations (No X2);
transmission off (Tx-off or No Tx); and
sleep (Sleep).

(Supplementary Note 13)

The radio communication system according to any one of Supplementary notes 2, 3 and 8 to 12, wherein said second radio base station updates said radio parameter in accordance with said management information to notify said update to a radio terminal in an own cell.

(Supplementary Note 14)

The radio communication system according to any one of Supplementary notes 2, 3 and 8 to 13, wherein said first radio base station notifies the above mentioned state control information to said control station before performing said state control, and
said control station notifies said state control execution information to said first radio base station after notifying said management information at least to said second radio base station.

(Supplementary Note 15)

The radio communication system according to Supplementary note 14, wherein said state control execution information includes at least one out of
an instruction for executing or completing said state control; and
a value of a parameter used for said state control.

(Supplementary Note 16)

A method for radio communication, wherein
on occurrence of a trigger for execution of state control of a first one of said radio base stations in a first radio base station;
said first radio base station notifies state control information including information regarding said state control to at least one out of a control station and other radio base stations than said first radio base station before or at a time of start of said state control or in an execution step of said state control.

(Supplementary Note 17)

The method for radio communication according to Supplementary note 16, wherein said control station sends one or both of the state control information regarding said first radio base station and
the management information regarding a radio parameter to be updated in accordance with said state control of said first radio base station
to at least a second radio base station that manages a cell neighboring to a cell of said first radio base station.

(Supplementary Note 18)

A method for radio communication, wherein said first radio base station notifies the state control information, which is the information regarding said state control, to at least one out of said control station and other radio base stations than said first radio base station, before or at a time of start of said state control of said first radio base station or in an execution step of said state control;
said control station notifying at least one out of the management information regarding the radio parameters to be updated in accordance with said state control and said state control information to at least a second one of said radio base stations connected to said control station; said second one of said radio base stations managing at least the cell neighboring to the cell of said first radio base station.

(Supplementary Note 19)

The method for radio communication according to any one of Supplementary notes 16 to 18, wherein said control station includes an upper order station managing said radio base stations or a central radio base station performing centralized control of said radio base stations.

(Supplementary Note 20)

The method for radio communication system according to any one of Supplementary notes 16 to 18, wherein said state control includes one out of
new installation or removal of a radio base station or relocating the radio base station to other site;
transmission on/off at a specified frequency managed by said first radio base station; and
wakeup/sleep of said first radio base station.

(Supplementary Note 21)

The method for radio communication according to Supplementary note 20, wherein said transmission on/off is performed by controlling the transmission power in a stepwise manner.

(Supplementary Note 22)

The method for radio communication according to any one of Supplementary notes 16 to 21, wherein said state control information includes at least one out of the result of said state control;

the forecast of said state control;

a request for said state control;

details of said state control; and the information that may be a reference of decision as to whether or not said state control is to be exercised.

(Supplementary Note 23)

The method for radio communication according to Supplementary note 17 or 18, wherein said management information includes at least one out of a configuration value of the radio parameter;

a difference between said configuration value of the radio parameter and a pre-update value of said configuration value of the radio parameter; and the control information regarding the radio parameter.

(Supplementary Note 24)

The method for radio communication system according to Supplementary note 23, wherein said radio parameter includes at least one out of a neighbor cell list;

transmission power;

an antenna tilt angle;

a handover parameter; and a cell reselection parameter.

(Supplementary Note 25)

The method for radio communication according to Supplementary note 24, wherein the second radio base station controls the value of said transmission power and/or said antenna tilt angle stepwise.

(Supplementary Note 26)

The radio communication system according to Supplementary note 24, wherein the information regarding said neighbor cell list is one out of addition to the neighbor cell list of a cell of the radio base station performing said state control;

removal of said cell from said neighbor cell list; and change of an attribute for a cell managed by the radio base station performing said state control.

(Supplementary Note 27)

The method for radio communication according to Supplementary note 26, wherein said attribute in said neighbor cell list includes at least one out of there being access restriction (Black list);

there being no access restriction (White list):

removal from said neighbor cell list not being possible (No Remove);

handover not being possible (No Handover);

there being no connection between radio base stations;

there being no information exchange between radio base stations (No X2);

transmission off (Tx-off or No Tx); and sleep (Sleep).

(Supplementary Note 28)

The method for radio communication according to any one of Supplementary notes 23 to 27, wherein said second radio base station updates said radio parameter in accordance with said management information to notify said update to a radio terminal in an own cell.

(Supplementary Note 29)

The method for radio communication according to any one of Supplementary notes 18 to 28, wherein said first radio base station notifies the above mentioned state control information to said control station before performing said state control;

said control station notifying the state control execution information to said first radio base station after notifying said management information to other radio base stations than said first radio base station.

(Supplementary Note 30)

The method for radio communication according to Supplementary note 29, wherein said state control execution information includes at least one out of an instruction for executing or completing said state control; and a value of a parameter used for said state control.

(Supplementary Note 31)

A radio base station comprising means for notifying, on occurrence of a trigger to prompt said state control of a radio base station, the state control information, which is the information regarding said state control, to at least one out of a control station and other radio base stations than said radio base station, before or at a time of start of said state control or in an execution step of said state control.

(Supplementary Note 32)

The radio base station according to Supplementary note 31, wherein the radio base station receives at least one out of the management information regarding radio parameters updated in accordance with said state control and said state control information from said control station.

(Supplementary Note 33)

The radio base station according to Supplementary note 32, wherein said state control is one out of new installation or removal of a radio base station or relocating the radio base station to other site;

transmission on/off at a specified frequency managed by said radio base station; and wakeup/sleep of said radio base station.

(Supplementary Note 34)

The radio base station according to Supplementary note 33, wherein, said transmission on/off is by controlling the transmission power in a stepwise manner.

(Supplementary Note 35)

The radio base station according to Supplementary note 32, wherein said management information includes at least one out of a configuration value of the radio parameter;

a difference between said configuration value of the radio parameter and a pre-update value of said configuration value of the radio parameter; and the control information regarding the radio parameter; and wherein, said radio parameter includes at least one out of a neighbor cell list;

transmission power;

an antenna tilt angle;

a handover parameter; and a cell reselection parameter.

(Supplementary Note 36)

The radio base station according to Supplementary note 35, wherein the value of said transmission power and/or said antenna tilt angle is controlled stepwise.

(Supplementary Note 37)

The radio base station according to Supplementary note 35, wherein the information regarding said neighbor cell list is one out of addition to the neighbor cell list of a cell of the radio base station performing said state control;

removal of said cell from said neighbor cell list; and change of an attribute for a cell managed by the radio base station performing said state control.
(Supplementary Note 38)
The radio base station according to Supplementary note 37, wherein the attribute in said neighbor cell list includes at least one out of
there being access restriction (Black list);
there being no access restriction (White list):
removal from said neighbor cell list not being possible (No Remove);
handover not being possible (No Handover);
there being no connection between radio base stations;
there being no information exchange between radio base stations (No X2);
transmission off (Tx-off or No Tx); and
sleep (Sleep).
(Supplementary Note 39)
The radio base station according to any one of Supplementary notes 32 to 38, wherein other radio base stations than said radio base station performing said state control update said radio parameters in accordance with said management information to notify said update to radio terminals within own cells.
(Supplementary Note 40)
The radio base station according to any one of Supplementary notes 31 to 39, further comprising
means for notifying said state control information to said control station before performing said state control;
said control station notifying, after notifying said management information to radio base stations other than said radio base station that notified said state control information, said state control execution information to said radio base station that notified said state control information;
said notifying means receiving the state control execution information from said control station.
(Supplementary Note 41)
A control station that receives from a first radio base station a notification of the state control information which is the information regarding state control,
said control station sending one or both of the state control information regarding said first radio base station and the management information regarding a radio parameter to be updated in accordance with said state control of said first radio base station, to at least a second radio base station managing a cell neighboring to a cell of said first radio base station.
(Supplementary Note 42)
The radio base station according to Supplementary note 41, wherein said state control is one out of
new installation or removal of a radio base station or relocating the radio base station to other site;
transmission on/off at a specified frequency managed by said first radio base station; and
wakeup/sleep of said first radio base station.
(Supplementary Note 43)
The control station according to Supplementary note 41 or 42, wherein said management information includes at least one out of
a configuration value of the radio parameter;
a difference between said configuration value of the radio parameter and a pre-update value of said configuration value of the radio parameter; and
the control information regarding the radio parameter; and
wherein said radio parameter includes at least one out of
a neighbor cell list;
transmission power;
an antenna tilt angle;
a handover parameter; and
a cell reselection parameter.
(Supplementary Note 44)
The control station according to Supplementary note 43, wherein the control information regarding said neighbor cell list is one out of
addition to the neighbor cell list of a cell of the radio base station performing said state control;
removal of said cell from said neighbor cell list; and
change of an attribute for a cell managed by the radio base station performing said state control.
(Supplementary Note 45)
The control station according to Supplementary note 44, wherein said attribute in said neighbor cell list includes at least one out of there being access restriction (Black list);
there being no access restriction (White list):
removal from said neighbor cell list not being possible (No Remove);
handover not being possible (No Handover);
there being no connection between radio base stations;
there being no information exchange between radio base stations (No X2);
transmission off (Tx-off or No Tx); and
sleep (Sleep).
(Supplementary Note 46)
A program causing a computer, composing said radio base station, to execute the processing of notifying, on occurrence of a trigger to prompt state control of said radio base station, the state control information to a control station before or at a time of start of said state control or in an execution step of said state control; said status information being the information regarding said state control.
(Supplementary Note 47)
The program according to Supplementary note 46, said program allowing said computer to execute the processing of receiving, from said control station, at least one out of the management information regarding radio parameters updated in accordance with said state control and said state control information.
(Supplementary Note 48)
A program causing a computer composing a control station to execute the processing of receiving from a first radio base station a notification of the state control information which is the information regarding state control;
and the processing of sending one or both of the state control information regarding said first radio base station and the management information regarding a radio parameter to be updated in accordance with said state control of said first radio base station, to at least a second radio base station managing a cell neighboring to a cell of said first radio base station.
(Supplementary Note 49)
A method for radio communication in which a given radio base station (eNB) requests a control station (O&M) to switch transmission in a cell managed by the own station off or on in case of occurrence of a preset trigger to prompt transmission on or off in said cell; and in which
said control station (O&M) on receiving said request changing an attribute in a neighbor relation table (NRT) regarding a neighbor radio base station (neighboring eNB) of said given radio base station (eNB).
(Supplementary Note 50)
The method for radio communication according to Supplementary note 49, wherein said control station (O&M) additionally checks or unchecks an attribute of no transmission (No Tx) regarding said cell.

(Supplementary Note 51)

The method for radio communication according to Supplementary note 49 or 50, wherein said control station (O&M) sends to said neighbor radio base station (neighboring eNB) the radio parameter information to be updated by said neighbor radio base station.

(Supplementary Note 52)

The method for radio communication according to Supplementary note 49 or 50, wherein said neighbor radio base station (neighboring eNB) updates the neighbor relation table (NRT) of the own station.

(Supplementary Note 53)

The method for radio communication according to Supplementary note 52, wherein said neighbor radio base station (neighboring eNB) updates radio parameters of the own station based on an instruction from said control station (O&M).

(Supplementary Note 54)

The method for radio communication according to Supplementary note 52 or 53, wherein said control station (O&M) sends to said given radio base station (eNB) an activation for transmission off or on; said given radio base station (eNB) executing transmission off or on.

(Supplementary Note 55)

A radio communication system comprising a plurality of radio base stations (eNBs) and a control station (O&M) connected to said radio base stations;

a first one (eNB) of said radio base stations requesting said control station (O&M) to switch transmission off or on in a cell managed by the own station on occurrence of a preset trigger to prompt transmission on or off in said cell;

said control station (O&M) on receiving said request changing an attribute in a neighbor relation table (NRT) of a neighbor radio base station (neighboring eNB) of said first radio base station (eNB).

(Supplementary Note 56)

The radio communication system according to Supplementary note 55, wherein said control station (O&M) additionally checks or unchecks an attribute of no transmission (No Tx) regarding said cell.

(Supplementary Note 57)

The radio communication system according to Supplementary note 55 or 56, wherein, said control station (O&M) sends the radio parameter information to be updated in said neighbor radio base station (neighboring eNB) to said neighbor radio base station.

(Supplementary Note 58)

The radio communication system according to Supplementary note 55 or 56, wherein said neighbor radio base station (neighboring eNB) updates radio parameters of the own station.

(Supplementary Note 59)

The radio communication system according to Supplementary note 58, wherein, said neighbor radio base station (neighboring eNB) updates radio parameters of the own station under an instruction from said control station.

(Supplementary Note 60)

The radio communication system according to Supplementary note 58 or 59, wherein, said control station (O&M) sends an activation of transmission off or on to said radio base station (eNB); said radio base station (eNB) executing transmission on or off.

The invention claimed is:

1. A radio base station in a radio communication system, comprising:
   a processor configured to operate a cell;
   an X2 interface connected with another radio base station; and
   a transceiver configured to communicate with a radio terminal in the cell;
   wherein the processor is further configured to:
     control a coverage state of the cell operated by the radio base station; and
     transmit, via the X2 interface, control information regarding a change of the coverage state to the another radio base station,
   wherein the control information includes:
     an advance notice of the change of the coverage state to be changed by the radio base station;
     ECGI (E-UTRAN Cell Global Identifier) of the cell; and
     an index value indicating the coverage state after the change by the radio base station.

2. The radio base station according to claim 1, wherein the processor is configured to control the coverage state using transmission power control of the radio base station or antenna control thereof.

3. The radio base station according to claim 1, wherein the control information is used to avoid failure regarding a handover.

4. A radio communication system comprising
   at least a first radio base station and a second radio base station, wherein
   the first radio base station comprises:
   a processor configured to operate a cell;
   an X2 interface connected with the second radio base station; and
   a transceiver configured to communicate with a radio terminal in the cell;
   wherein the processor is configured to:
     control a coverage state of the cell operated by the first radio base station; and
     transmit, via the X2 interface, control information regarding a change of the coverage state to the second radio base station, and
   wherein the control information includes:
     an advance notice of the change of the coverage state to be changed by the first radio base station;
     ECGI (E-UTRAN Cell Global Identifier) of the cell; and
     an index value indicating the coverage state after the change by the first radio base station.

5. The radio communication system according to claim 4, wherein the processor is configured to control the coverage state using transmission power control of the first radio base station or antenna control thereof.

6. The radio communication system according to claim 4, wherein the control information is used to avoid failure regarding a handover.

7. A method for a radio station, the method comprising:
   operating a cell;
   communicating with a radio terminal in the cell;
   controlling a coverage state of the cell operated by the radio base station; and
   transmitting, via an X2 interface connected between the radio base station and another radio base station, control information regarding a change of the coverage to the another radio base station,
   wherein the control information includes:
     an advance notice of the change of the coverage to be changed by the radio base station;
     ECGI (E-UTRAN Cell Global Identifier) of the cell; and an index value indicating the coverage state after the change by the radio base station.

8. The method according to claim 7, wherein the radio base station controls the coverage state using transmission power control of the radio base station or antenna control thereof.

9. The method according to claim 7, wherein the control information is used to avoid failure regarding a handover.

* * * * *

UNITED STATES PATENT AND TRADEMARK OFFICE
CERTIFICATE OF CORRECTION

PATENT NO.        : 10,219,165 B2
APPLICATION NO.   : 15/245701
DATED             : February 26, 2019
INVENTOR(S)       : Hisashi Futaki It is certified that error appears in the above-identified patent and that said Letters Patent is hereby corrected as shown below:

In the Specification

Column 6, Line 11; After "first", delete "335"

Column 7, Line 54; After "eNB1,", delete "425"

Signed and Sealed this
Thirtieth Day of July, 2019

Andrei Iancu
*Director of the United States Patent and Trademark Office*